United States Patent
Yuasa

(10) Patent No.: US 7,193,738 B2
(45) Date of Patent: Mar. 20, 2007

(54) IMAGE PROCESSING APPARATUS AND METHOD

(75) Inventor: Nobuyuki Yuasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 10/192,157

(22) Filed: Jul. 11, 2002

(65) Prior Publication Data

US 2003/0016390 A1    Jan. 23, 2003

(30) Foreign Application Priority Data

Jul. 19, 2001 (JP) ............................. 2001-219790
May 17, 2002 (JP) ............................. 2002-143058

(51) Int. Cl.
G06F 3/12 (2006.01)
G06K 15/00 (2006.01)
G06K 15/02 (2006.01)
G09G 5/00 (2006.01)

(52) U.S. Cl. ..................... 358/1.15; 358/1.16; 358/1.1; 345/612

(58) Field of Classification Search ............... 358/1.15, 358/1.16, 1.1; 345/612
See application file for complete search history.

(56) References Cited

U.S. PATENT DOCUMENTS 5,086,434 A * 2/1992 Abe et al. .................... 375/219

FOREIGN PATENT DOCUMENTS

| JP | 04-215189 | 8/1992 |
| JP | 05-252209 | 9/1993 |
| JP | 09-319863 | 12/1997 |
| JP | 11-232468 | 8/1999 |

* cited by examiner

Primary Examiner—King Y. Poon
Assistant Examiner—Thomas J. Lett
(74) Attorney, Agent, or Firm—Fitzpatrick, Cella, Harper & Scinto

(57) ABSTRACT

The present invention concerns an image processing device that is connectable to a general-purpose bus of a second image processing apparatus that includes a memory. An image dividing device generates divided images by dividing an original image, and stores the divided images in the memory. An image connecting device generates an original image by connecting divided images stored in the memory.

4 Claims, 31 Drawing Sheets

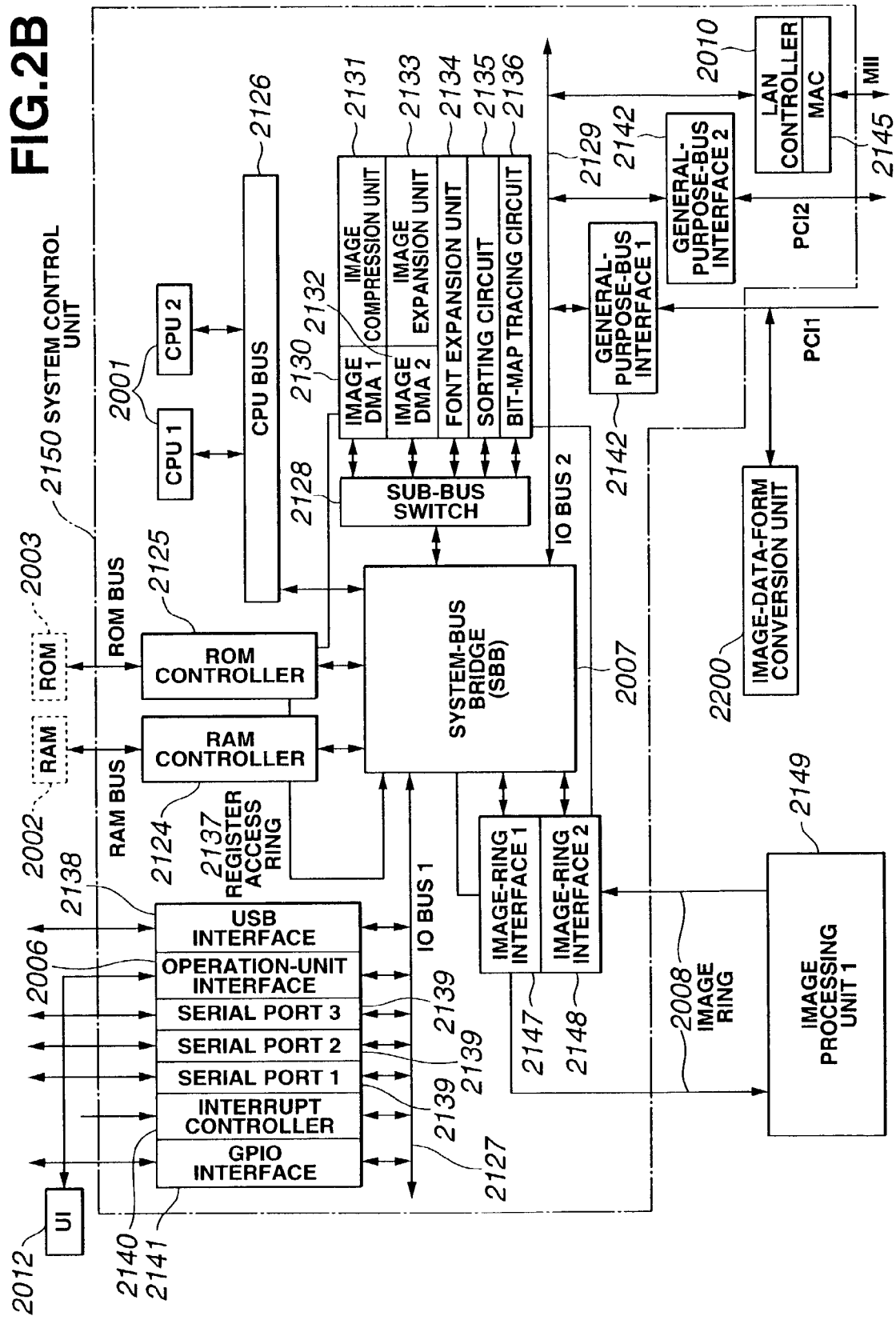

IMAGE PROCESSING APPARATUS AND METHOD

BACKGROUND OF THE INVENTION

1. Field of the Invention

The present invention relates to an image processing apparatus connected to a general-purpose bus provided in another image processing apparatus, and to an image processing method.

2. Description of the Related Art

Digital composite apparatuses having a scanning function, a printer function, a copying function, a facsimile function, a network function and the like have been known. Such a digital composite apparatus incorporates a dedicated controller for controlling and managing respective functional operations. The controller incorporates an image processing unit, an image memory and the like, and can perform various types of image processing for image data input from a scanner unit or a network, and output resultant data.

Conventionally, an image read by a scanner unit, a raster image to be output to a printer unit, or an image received via a network is processed in units of a page. Accordingly, it is necessary to secure spaces in units of a page in an image memory. When performing processing for an image in units of a page, since resources, such as an image processing unit and the like, are occupied until the processing is terminated, it is difficult to perform a plurality of sets of processing simultaneously and at a high speed.

Recently, controllers have been proposed in which image data for one page is divided into data having a size to allow easy processing in parallel, and processing is performed in units of divided image data. In such a controller, since the ratio of occupation of each resource can be minimized, simultaneous execution of a plurality of sets of processing becomes easier. In addition, processing can be performed at a high speed. However, in order to realize processing by dividing image data, processing for dividing image data in units of a page must be performed. It is also necessary to manage divided image data. Such image dividing processing, management of divided image data, and the like can be performed by software executed by a CPU (central processing unit) of the controller.

However, if the amount of image data is large, a considerable time is required for such operations, resulting in an increase in the load for the CPU of the controller, and incapability of performing high-speed processing.

SUMMARY OF THE INVENTION

The present invention addresses the above problems by an image processing device that is connected to a second image processing device and which performs some of the processing functions that would be otherwise performed by the second image processing device. This arrangement results in increased processing efficiency due to the reduced load on the second image processing device.

According to one aspect of the present invention, an image processing device is connectable to a general-purpose bus of a second image processing apparatus that includes a memory. A division means generates divided images by dividing an original image, and stores the divided images in the memory. A connection means generates an original image by connecting divided images stored in the memory.

Preferably, the division means includes an attribute information addition unit that generates data packets by adding attribute information to the divided images. An image compression unit compresses the original image according to a pre-determined format and transmits the compressed original image to the attribute information addition unit. Preferably, the connection means includes an attribute information deletion unit for deleting attribute information from data packets. The connection means also preferably includes an image expansion unit that expands the compressed divided images stored in the memory, and transmits the expanded divided images to the attribute information deletion unit. Preferably, a management table generation unit controls storage of the divided images in the memory. Preferably, the second image processing apparatus includes division functionality to divide an original image into divided images and images from the division means have a format that is compatible with that of the division functionality. Preferably, the second image processing apparatus further includes connection functionality to connect divided images into an original image and the connection means connects images in a format that is compatible with that of the above connection functionality.

By virtue of this arrangement, connection and division of images, which would otherwise be performed by the second image processing device are performed by the image processing device, resulting in increased efficiency by reducing the processing load of the second image processing device.

According to another aspect of the present invention, an image processing apparatus that is connectable to a general-purpose bus provided in a second image processing apparatus includes a memory. A reception means receives divided images obtained by dividing an original image from an external apparatus via a communication medium. A connection means generates an original image by connecting the divided images received by the reception means, and the connected images are stored in the memory. A division means generates divided images by dividing an original image received from the memory. A transmission means transmits the divided images generated by the division means to the external apparatus via the communication medium.

Preferably, a bypassing means directly transfers divided images received by the reception means to the memory. Preferably, a bypassing means directly transfers divided images from the memory to the external apparatus.

By virtue of this arrangement, connection and/or division functions of images, which would otherwise be performed by the second image processing device are performed by the image processing device, resulting in increases processing efficiency by reducing the processing load of the second image processing device.

According to another aspect of the present invention, an image processing apparatus is connectable to a general-purpose bus provided in a second image processing apparatus, which includes a memory. A reception means receives an original image from an external apparatus via a communication medium. A division means generates divided images by dividing the original image received from the reception means, and the divided images are stored in the memory. A connection means generates an original image by connecting the divided images received from the memory. A transmission means transmits the original image generated by the connection means to the external apparatus via the communication medium.

Preferably, a bypassing means directly transfers an original image received from the reception means to the memory. Preferably, a bypassing means directly transfers an original image received from the memory to the external apparatus.

By virtue of this arrangement, the connection and/or division of images functions, which would otherwise be performed by the second image processing device are performed by the image processing device, resulting in increased processing efficiency by reducing the processing load of the second image processing device.

According to another aspect of the present invention, an image processing apparatus includes an image processing means for performing image processing in units of a divided image obtained by dividing an original image, a CPU (central processing unit) controls image processing by the image processing means. An accelerator performs image conversion of an image related to the image processing means. The image conversion of the image related to the image processing means is executed in parallel by software processing by said CPU and by hardware processing by the accelerator.

Preferably, data resulting from the hardware processing and the software processing are capable of being stored on, and retrieved from a common storage medium.

By virtue of this arrangement, the image conversion function is performed in parallel by hardware processing by the accelerator, and by software processing by the CPU. This results in increased efficiency of the system by performing by hardware, some functions which would be otherwise be performed by software by the CPU.

This brief summary has been provided so that the nature of the invention may be understood quickly. A more complete understanding of the invention can be obtained by reference to the following detailed description of a preferred embodiment thereof in connection with the attached drawings.

BRIEF DESCRIPTION OF THE DRAWINGS

FIG. 2B is a block diagram illustrating an example of the internal configuration of a system control unit shown in FIG. 2A;

DETAILED DESCRIPTION OF THE PREFERRED EMBODIMENTS

Preferred embodiments of the present invention will now be described with reference to the drawings.

(First Embodiment)

[Mode of Use of a Digital Composite Apparatus]

Figure 1:
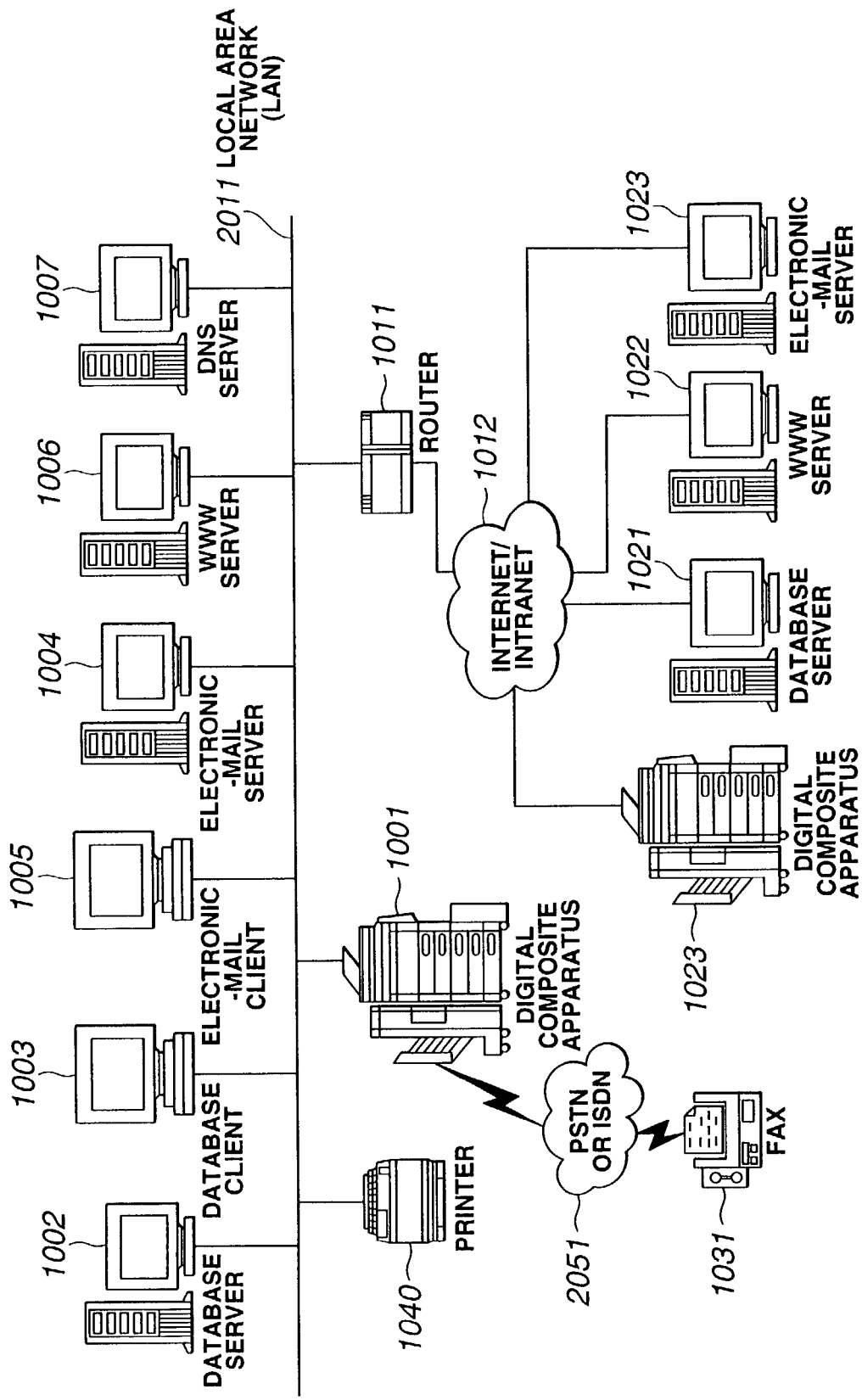
FIG. 1 is a block diagram illustrating an example of the configuration of a network when a digital composite apparatus is connected to the network, according to a first embodiment of the present invention.

FIG. 1 is a block diagram illustrating an example of the configuration of a network when a digital composite apparatus is used by being connected to the network, according to a first embodiment of the present invention.

As shown in FIG. 1, respective apparatuses constituting the network are connected to a LAN (local area network) 2011. Reference numeral 1001 represents the digital composite apparatus having a configuration shown in FIGS. 2A–2C. According to this configuration, the digital composite apparatus 1001 can output an image read by a scanner 2070 to the LAN 2011, and print an image received from the LAN 2011 by a printer 2095. The digital composite apparatus 1001 also can transmit an image read by the scanner 2070 to a PSTN (public switched telephone network) or the ISDN (Integrated Services Digital Network) 2051 using facsimile transmission means (not shown), or print an image received form the PSTN or ISDN using the printer 2095.

A database server 1002 manages binary images and multivalue images read by the digital composite apparatus 1001 as a database. A client 1003 of the database server 1002 can, for example, read/retrieve image data preserved in the database server 1002.

An electronic-mail server 1004 has an electronic-mail transmitting/receiving function, a mail-box function and the like. A client 1005 of the electronic-mail server 1004 can transmit/receive an electronic mail via the electronic-mail server 1004. The electronic-mail server 1004 and the electronic-mail client 1005 can transmit/receive an image read by the digital composite apparatus 1001 as an attached file of an electronic mail.

A WWW (World Wide Web) server 1006 provides the LAN 2011 with an HTML (Hyper Text Markup Language) document. The HTML document provided by the WWW server 1006 can be printed by the digital composite apparatus 1001.

A DNS (Domain Name System) server 1007 for managing a domain-name service, and a printer 1040 for image formation are also connected to the LAN 2011. The LAN 2011 is connected to the Internet/intranet 1012 via a router 1011.

As shown in FIG. 1, apparatuses similar to the above-described apparatuses, i.e., a digital composite apparatus 1023, a database server 1021, a WWW server 1022, an electronic-mail server 1023 and the like, are sometimes connected to the Internet/intranet 1012.

The digital composite apparatus 1001 can communicate with a FAX (facsimile) apparatus 1031 via the PSTN or ISDN 2051.

[Configuration of the Digital Composite Apparatus]

Figure 2A:
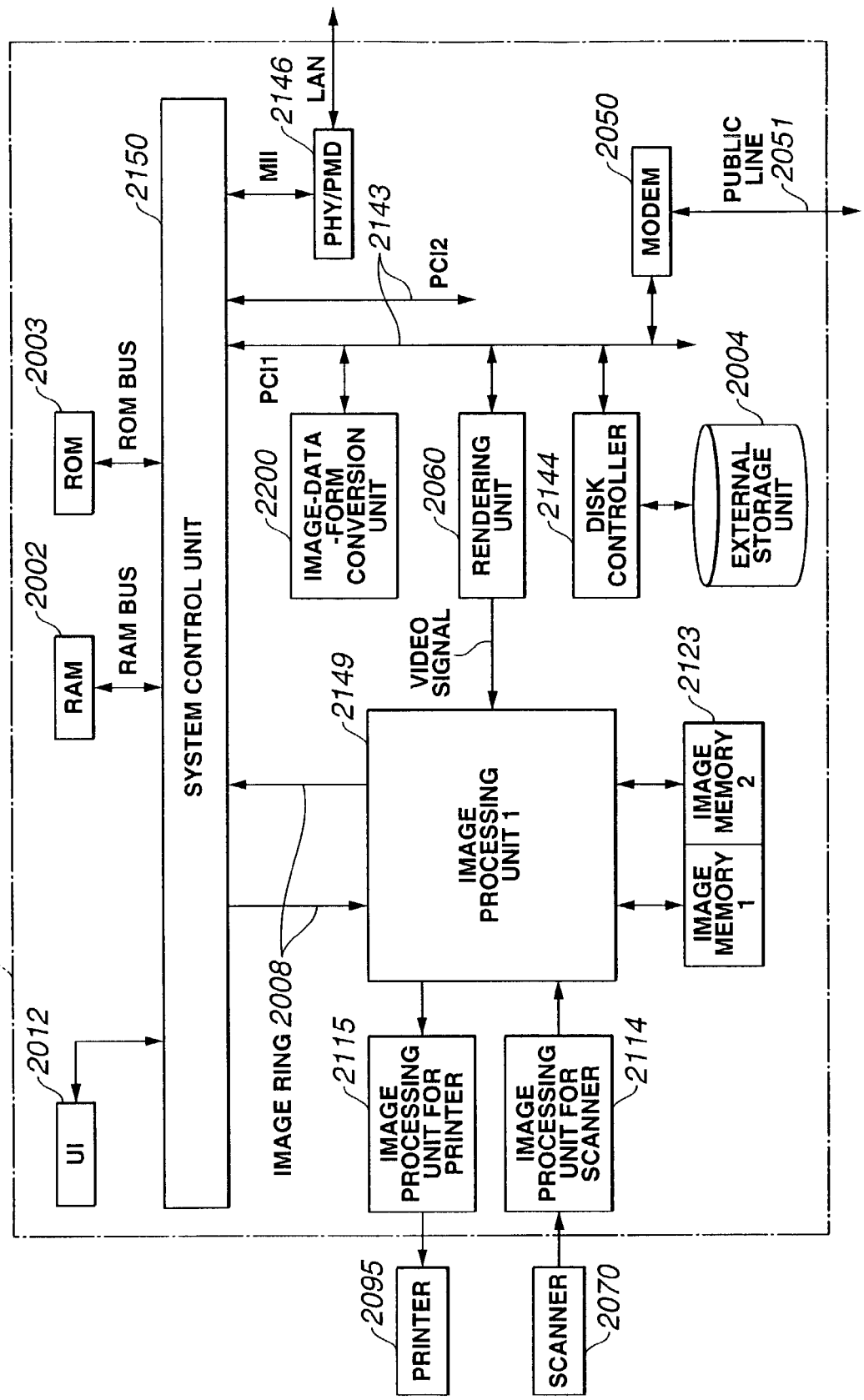
FIG. 2A is a block diagram illustrating an example of the entire configuration of the digital composite apparatus using an image processing apparatus, according to the first embodiment.
Figure 2C:
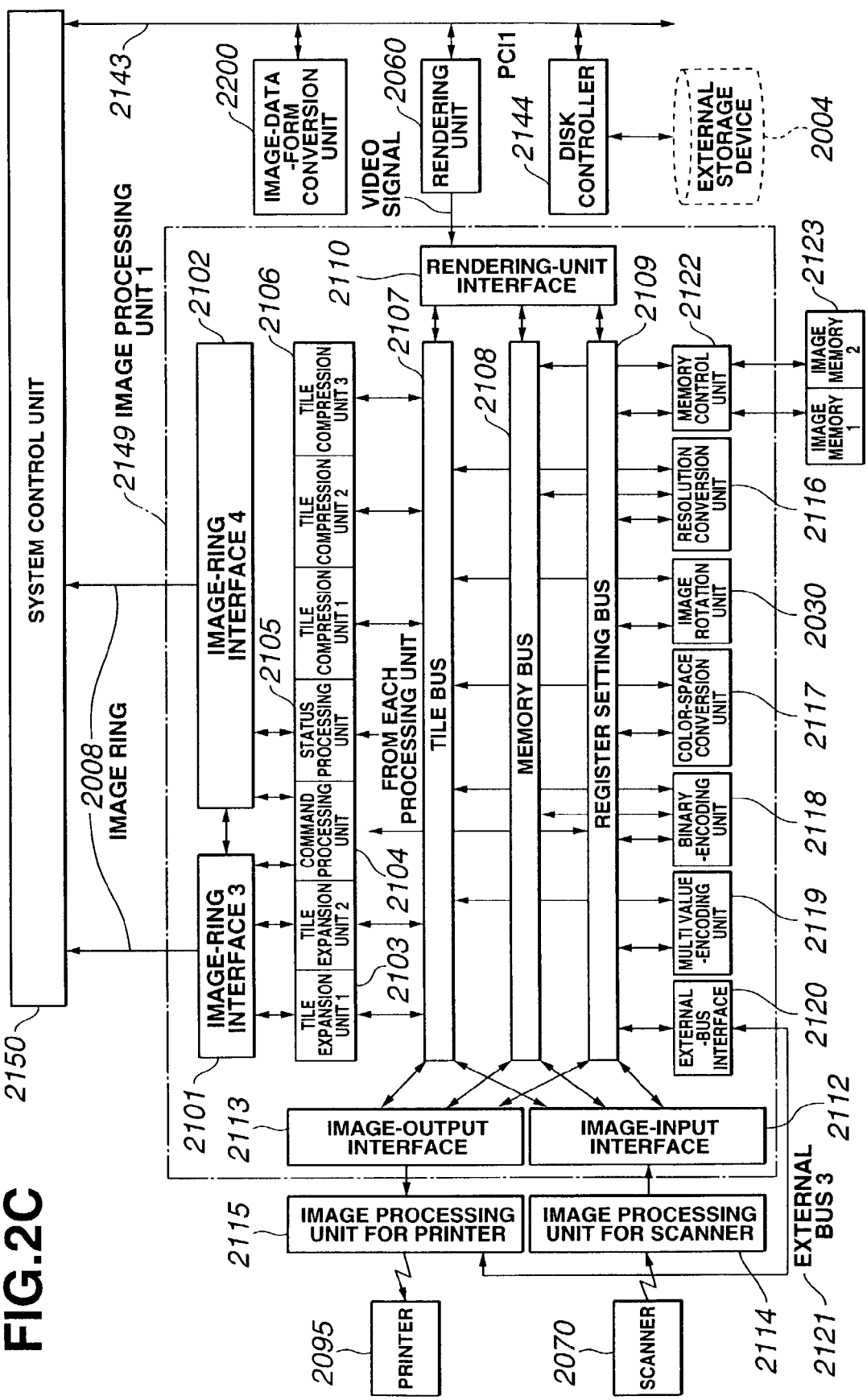
FIG. 2C is a block diagram illustrating an example of the configuration of an image processing unit 1 shown in FIG. 2B.

FIGS. 2A, 2B and 2C are block diagrams illustrating an example of the configuration of the digital composite apparatus 1001 using an image processing apparatus according to the first embodiment. FIG. 2A is a diagram illustrating the entire configuration of the digital composite apparatus 1001 of the first embodiment; FIG. 2B is a diagram illustrating the internal configuration of a system control unit 2150 shown in FIG. 2A; and FIG. 2C is a diagram illustrating the internal configuration of an image processing unit 1 2149 shown in FIG. 2A. The present invention may, of course, be applied not only to the digital composite apparatus having the configuration shown in FIGS. 2A–2C, but also to any other image processing apparatus having an arbitrary configuration.

An image-processing-apparatus controller 2000 of the first embodiment is a controller for the image processing apparatus, that is connected to the scanner 2070, serving as an image input device, and the printer 2095, serving as an image output device, and that can exchange data and perform image input/output with an external apparatus via the LAN 2011 or a public line (WAN (wide area network)).

A system control unit 2150 incorporates CPUs 2001, and controls the entirety of the digital composite apparatus 1001. In the first embodiment, two CPUs 2001 are used. These two CPUs 2001 are connected to a system-bus bridge 2007 via a common CPU bus 2126.

The system-bus bridge 2007 operates as a first bus switch. The CPU bus 2126, a RAM (random access memory) controller 2124, a ROM (read-only memory) controller 2125, an IO bus 1 2127, a sub-bus switch 2128, an IO bus 2 2129, an image-ring interface 1 2147, an image-ring interface 2 2148 are connected to the system-bus bridge 2007.

The sub-bus switch 2128 operates as a second bus switch. An image DMA 1 2130, an image DMA 2 2132, a font expansion unit 2134, a sorting circuit 2135 and a bit-map tracing circuit 2136 are connected to the sub-bus switch 2128. The sub-bus switch 2128 arbitrates memory-access requests output from these DMAs, and connects an appropriate request to the system-bus bridge 2007.

A RAM 2002 operates as a system working memory to be operated by a CPU 2001, and also operates as an image memory for temporarily storing image data. The RAM 2002 is controlled by the RAM controller 2124, and as will be described later, is used for storing image data in the form of data packets. In the first embodiment, for example, a direct RDRAM is used as the RAM 2002.

The ROM 2003 comprises a boot ROM, where boot programs of the system are stored. The ROM 2003 is controlled by the ROM controller 2125.

The image DMA 1 2130 is connected to an image compression unit 2131, and controls reading and compression of uncompressed data stored in the RAM 2002 and rewriting of data after compression by the image compression unit 2131, based on information set via a resister access ring 2137. In the first embodiment, for example, a JPEG (Joint Photographic Experts Group) algorithm is adopted as a compression algorithm.

The image DMA 2 2132 is connected to an image expansion unit 2133, and controls reading and expansion of compressed data stored in the RAM 2002 and rewriting of data after expansion by the image expansion unit 2133, based on information set via the resister access ring 2137. In the first embodiment, for example, a JPEG algorithm is adopted as an expansion algorithm corresponding to the above-described compression algorithm.

The font expansion unit 2134 expands compressed font data stored in the ROM 2003 or the RAM 2002, based on font codes contained in PDL (Page Description Language) data transferred from the outside via a LAN interface 2010 or the like. In the first embodiment, for example, an FBE algorithm is adopted.

The sorting circuit 2135 rearranges the order of objects in a display list generated when developing the PDL data. The bit-map tracing circuit 2136 extracts edge information from bit-map data. The IO bus 1 2127 is one of internal IO buses. A controller for a USB (Universal Serial Bus), serving as a standard bus, a USB interface 2138, a general-purpose serial port 2139, an interrupt controller 2140 and a GPIO interface 2141 are connected to the IO bus 1 2127. The IO bus 1 2127 includes a bus arbiter (not shown).

An operation-unit I/F 2006 is connected to an operation unit (UI) 2012, and outputs image data to be displayed on the operation unit 2012 to the operation unit 2012. The operation-unit I/F 2006 also transmits information input from the operation unit 2012 by the user, to the CPU 2001.

The IO bus 2 2129 is one of internal IO buses. General-purpose-bus interfaces 1 and 2 2142 and a LAN controller

2010 are connected to the IO bus 2 2129. The IO bus 2 2129 includes a bus arbiter (not shown).

General-purpose-bus interfaces 1 and 2 2142 are two identical bus interfaces, each of which is a bus bridge for supporting a standard IO bus. In the first embodiment, a case of adopting PCI (Peripheral Component Interconnect) buses is shown.

In the first embodiment, the PCI bus 2143 is connected to an image-data-form conversion unit 2200 that is a principal unit of the first embodiment, a rendering unit 2060, an external storage device 2004, and the like. The PCI bus 2143 realize free transfer of image data between these units, and can transfer data to respective blocks within a system control unit 2150 via the general-purpose-bus interface 1 or 2 2142.

The image-data-form conversion unit 2200 is a principal unit of the first embodiment, and has a function of reading page-image data stored in the external storage unit 2004 or the like, and converting the read data into tile-image data by dividing the data, a function of generating and outputting data packets obtained by adding header information to the tile-image data, a function of extracting tile-image data by deleting header information from input data packets, a function of converting a plurality of sets of tile-image data into page-image data by connecting the sets of tile-image data, and a function of generating a management table for managing data packets.

The external storage unit 2004 comprises a hard-disk drive (HDD), and stores system software, image data and the like. The external storage unit 2004 is connected to one of the PCI buses 2143 via a disk controller 2144.

The LAN controller 2010 is connected to the LAN 2011 via a MAC circuit 2145 and a PHY/PMD circuit 2146, and performs input/output of information. A modem 2050 is connected to the public line 2051, and performs input/output of information.

Each of an image-ring interface 1 2147 and an image-ring interface 2 2148 is an interface for connecting the system-bus bridge 2007 to an image ring 2008 for transferring image data at a high speed, and operates as a DMA (direct memory access) controller for transferring compressed image data between the RAM 2002 and the image processing unit 1 2149.

The image ring 2008 is a bus configured by a pair of unilateral connection paths (an image ring interface 1 and an image ring interface 2). The image ring 2008 is connected to tile expansion units 2103, a command processing unit 2104, a status processing unit 2105 and tile compression units 2106 via an image-ring interface 3 2101 and an image-ring interface 4 2102, within the image processing unit 2149. In the first embodiment, a case of providing two time expansion units 2103 and three tile compression units 2106 is illustrated.

The tile expansion units 2103 are connected to the image-ring interface 3 2101 and a tile bus 2107. The tile expansion unit 2103 expands image data after compression that has been input from the image ring 2008, and transfers the resultant data to the tile bus 2107. In the first embodiment, for example, a JPEG algorithm and pack-bits algorithm are adopted as expansion algorithms for multivalue data and binary data, respectively.

The tile compression units 2106 are connected to the image-ring interface 4 2102 and the tile bus 2107. The tile compression unit 2106 is a bus bridge for compressing image data before compression that has been input from the tile bus 2107, and transfers resultant data to the image ring 2008. In the first embodiment, for example, a JPEG algorithm and pack-bits algorithm are adopted as compression algorithms for multivalue data and binary data, respectively.

The command processing unit 2104 is connected to the image-ring interfaces 3 2101 and 4 2102, and a register setting bus 2109, and writes a register-setting request provided by the CPU 2001 that has been input via the image ring 2008, in a corresponding block connected to the register setting bus 2109. The command processing unit 2104 also reads information from a corresponding register via the register setting bus 2109 based on a register-reading request provided by the CPU 2001, and transfers the read information to the image-ring interface 4 2102.

The status processing unit 2105 monitors information relating to respective image-data processing units (a multivalue-encoding unit 2119, a binary-encoding unit 2118, a color-space conversion unit 2117, an image rotation unit 2030, and a resolution conversion unit 2116 (to be described later)) generates an interrupt packet for providing interrupt for the CPU 2001, and outputs the generated packet to the image-ring interface 4.

In addition to the above-described blocks, the following functional blocks are connected to the tile bus 2107: a rendering-unit interface 2110, an image-input interface 2112, an image-output interface 2113, the multivalue-encoding unit 2119, the binary-encoding unit 2118, the color-space conversion unit 2117, the image rotation unit 2030 and the resolution conversion unit 2116.

The rendering-unit interface 2110 inputs a bit-map image generated by the rendering unit 2060 (to be described later). The rendering unit 2060 and the rendering-unit interface 2110 are connected by an ordinary video signal. The rendering-unit interface 2110 is connected to the tile bus 2107, a memory bus 2108 and a register setting bus 2109. The rendering-unit interface 2110 converts an input raster image into a tile image according to a predetermined method set via the register setting bus 2109, synchronizes clock signals, and outputs resultant data to the tile bus 2107.

The image-input interface 2112 inputs raster-image data subjected to image correction processing by an image processing unit 2114 for the scanner (to be described later), converts the input raster-image data into a tile image according to a predetermined method set via the register setting bus 2109, synchronizes clock signals, and outputs resultant data to the tile bus 2107. The image-output interface 2113 inputs tile-image data from the tile bus 2107, converts the input tile-image data into a raster-image data, changes the clock rate, and outputs the raster-image data to an image processing unit 2115 for the printer.

The image rotation unit 2030 rotates image data. The resolution conversion unit 2116 changes the resolution of image data. The resolution conversion unit 2116 operates as magnification varying means. The color-space conversion unit 2117 converts the color space of a color or gray-scale image. The binary-encoding unit 2118 performs binary encoding of a multivalue (color or gray-scale) image. The multivalue-encoding unit 2119 converts a binary image into a multivalue image.

An external-bus interface unit 2120 is a bus bridge for receiving a read/write request provided by the CPU 2001 via the image-ring interfaces 1 2147, 2 2148, 3 2101 and 4 2102, the command processing unit 2104 and the resister setting bus 2109, and outputting the received request to an external bus 3 2121 (see FIG. 2C). In the first embodiment, the external bus 3 2121 is connected to the image processing unit 2115 for the printer and the image processing unit 2114 for the scanner.

A memory control unit 2122 is connected to the memory bus 2108, and performs operations, such as writing, reading, and refreshing if necessary, with respect to image memories 1 and 2 2123 subjected to address division in advance, in accordance with requests from the respective image-data processing units 2116, 2117, 2118, 2119 and 2030 within the image processing unit 1 2149. In the first embodiment, for example, an SDRAM is used as the image memory.

The image processing unit for the scanner 2114 performs predetermined image correction processing for image data as a result of scanning by the scanner 2070, serving as an image input device. The image processing unit for the printer 2115 performs predetermined image correction processing for image formation and output, and outputs the result of the processing to the printer 2095. The rendering unit 2060 develops PDL codes or intermediate display lists into a bit-map image.

[The Structure of Packets]

Next, the format of packets used in processing of image data in the first embodiment will be described. The image-processing-apparatus controller 2000 of the first embodiment transfers image data, commands from the CPU 2001, and interrupt information provided by the respective image-data processing units 2116, 2117, 2118, 2119 and 2030 in the form of packets. The following types of packet data are present.

Figure 3:
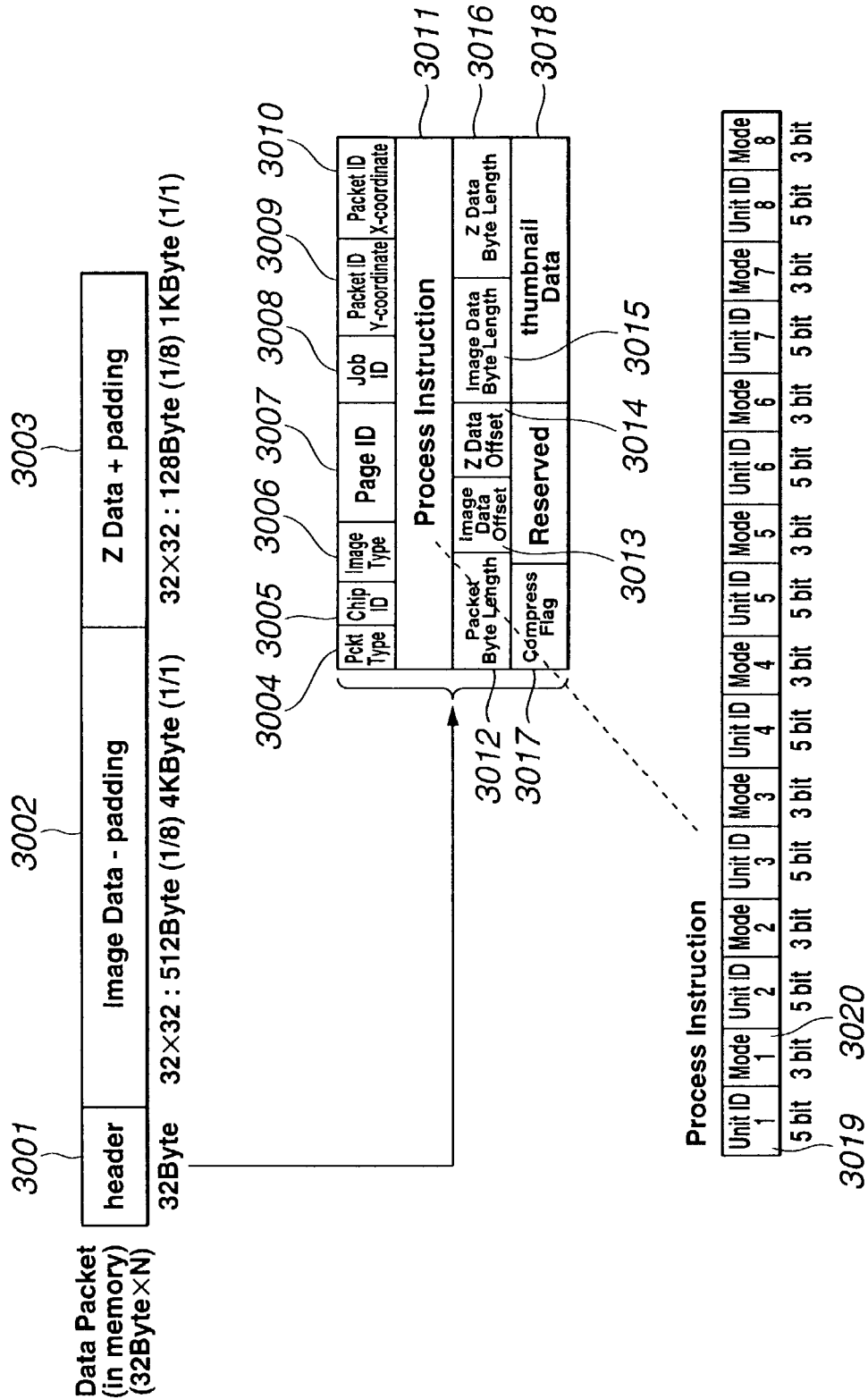
FIG. 3 is a diagram illustrating the format of a data packet in the first embodiment.

(1) Data Packet (See FIG. 3)

FIG. 3 is a diagram illustrating the format of a data packet in the first embodiment. A data packet includes image data 3002 in units of a tile obtained by dividing an image into portions having a predetermined number of pixels (in the first embodiment, 32 pixels×32 pixels), header information 3001 where control information (to be described later) is stored, and additional image information 3003.

In data-packet processing to be described later, nothing is particularly mentioned about processing relating to the additional image information 3003. However, the additional image information 3003 is generated or deleted as the header information 3001 at the same timing of generation and deletion of the header information 3001.

Information included in the header information 3001 will now be described.

The type of the packet is identified by PcktType 3004 within the header information 3001. A repeat flag is included in the PcktType 3004. When the image data 3002 is the same as image data of a data packet that has been transmitted immediately before the concerned data packet, the repeat flag is set.

ChipID 3005 indicates the destination of transmission of the packet. ImageType 3006 indicates the type of the image data 3002. PageID 3007 indicates the page number of the image data 3002. In JobID 3008, a job ID for managing image processing by software is stored.

Packet IDY 3009 and packet IDX 3010 indicate the position of a tile corresponding to image data contained in the packet (or assigned image data), in the entire image. The position of the tile is represented by a combination YnXn, where Yn is the coordinate in the y direction (PacketIDY 3009) and Xn is the coordinate in the x direction (PacketIDX 3010).

There are two cases for the data packet, i.e., a case in which image data is compressed, and a case in which image data is not compressed. In the first embodiment, an example in which a JPEG algorithm is adopted for multivalue color data (including multivalue gray-scale data), and a pack-bits algorithm is adopted for binary data, is shown. Discrimination between compressed data and uncompressed data is indicated by CompressFlag 3017.

ProcessInstruction 3011 includes process Units 1–8, each including a pair of 5-bit UnitID 3019 and 3-bit Mode 3020. The process Units are sequentially processed from the left (subordinate data). The processed UnitID and Mode are abandoned, and the entirety of Process Instruction is shifted to the left by eight bits so that the UnitID and Mode to be subsequently processed are positioned at the left end. Maximum eight pairs of Unit ID 3019 and Mode 3020 are stored in ProcessInstruction 3011. UnitID 3019 assigns an image-data processing unit, and Mode 3020 assigns the operational mode of the assigned image-data processing unit. Thus, it is possible to assign consecutive processing operations by maximum eight image-data processing units for imaged data contained in an image-data packet (or assigned image data).

PacketByteLength 3012 indicates the total number of bites of the packet. ImageDataByteLength 3015 indicates the number of bytes of the image data. ZDataByteLength 3016 indicates the number of bytes of additional image information. ImageDataOffset 3013 and ZDataOffset 3014 indicate offset from the head of the packet, of the image data and the additional image information, respectively.

Figure 4:
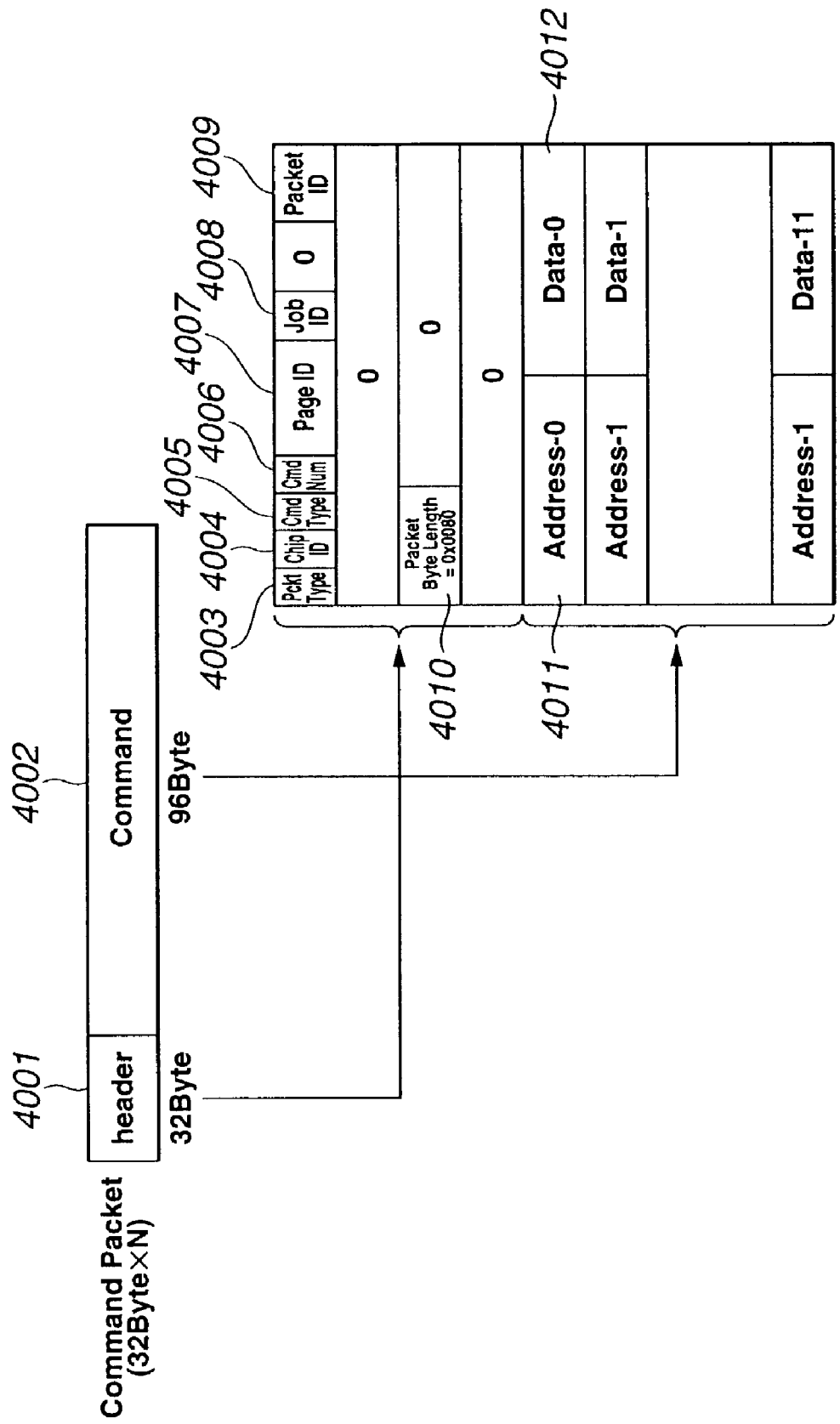
FIG. 4 is a diagram illustrating the format of a command packet in the first embodiment.

(2) Command Packet (See FIG. 4)

FIG. 4 is a diagram illustrating the format of a command packet in the first embodiment. The command packet is for accessing the register setting bus 2109. By using this packet, access from the CPU 2001 to the image memory 2123 can be performed. The command packet includes a header 4001 and a command (a packet-data portion) 4002.

In ChipID 4004 in the header 4001, an ID representing the image processing unit 2149, serving as the destination of transmission of the command packet, is stored. In PageID 4007 and JobID 4008, a Page ID and a Job ID for performing management by software are stored, respectively. PacketID 4009 is represented one dimensionally. In PacketID 4009, only the x coordinate of DataPacket is used. PacketByteLength 4010 is fixed to 128 bytes. In the packet-data portion 4002, maximum twelve commands, each including a pair of an address 4011 and data 4012, can be stored. The type of a command, i.e., a write command or a read command, is indicated by CmdType 4005, and the number of commands is indicated by CmdNum 4006 (see FIG. 4).

Figure 5:
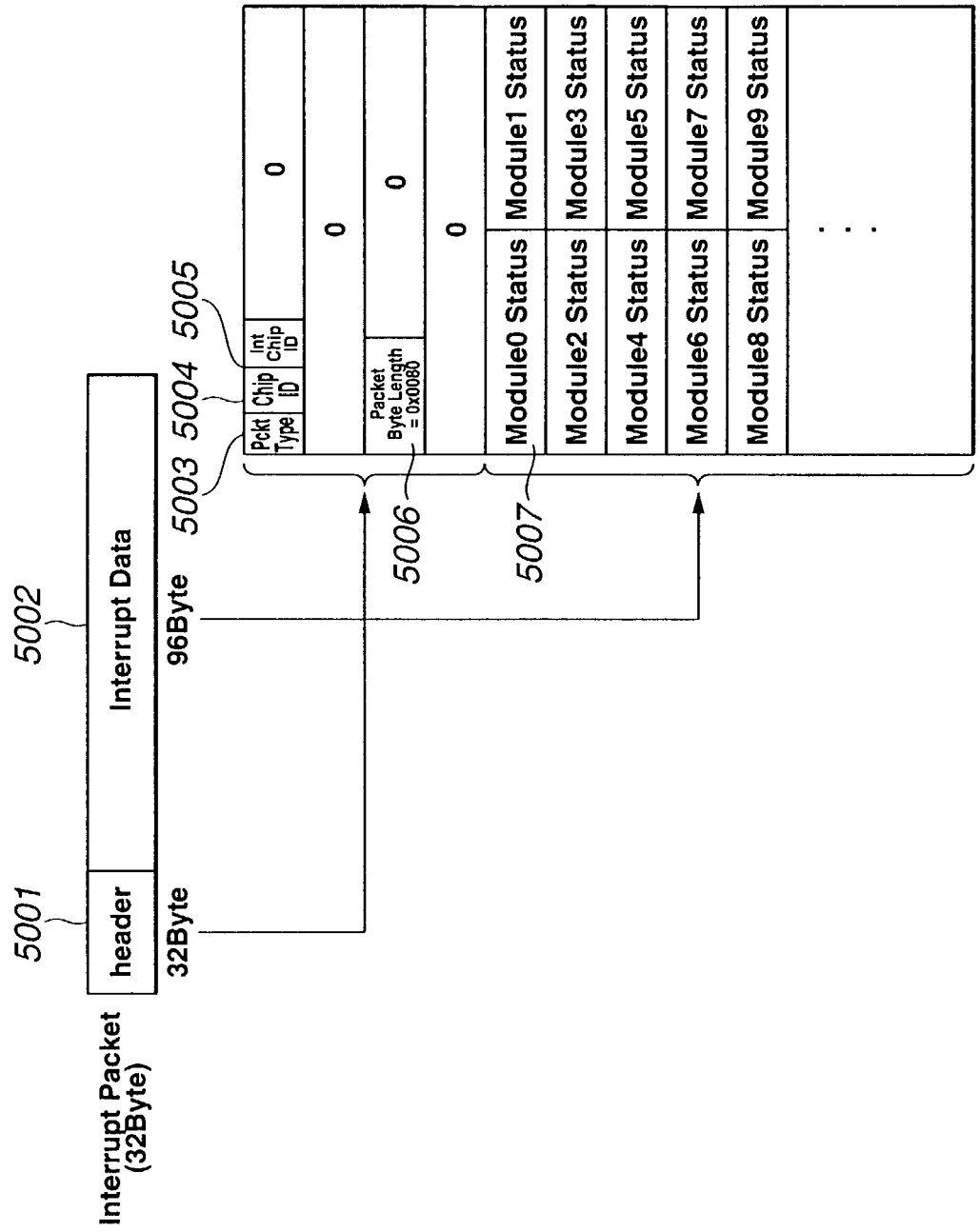
FIG. 5 is a diagram illustrating the format of an interrupt packet in the first embodiment.

(3) Interrupt Command (See FIG. 5)

FIG. 5 is a diagram illustrating the format of an interrupt packet in the first embodiment. An interrupt packet includes a header 5001 and interrupt data (a packet-data portion) 5002, and is used for notifying interrupt from the image processing unit 2149 to the CPU 2001. When an interrupt packet has been transmitted, the status processing unit 2105 must not transmit an interrupt packet until subsequent transmission is permitted. In the packet-data portion 5002, status information 5007 relating to each internal module of the image processing unit 2149 is stored. The status processing unit 2105 can collect status information relating to each module within the image processing unit 2149, and transmit the collected information to the system control unit 2150 at a time.

In ChipID 5004, an ID indicating the system control unit 2150, serving as the destination of transmission of the interrupt packet is stored. In IntChipID 5005, an ID indicating the image processing unit 2149, serving as a transmitter of the interrupt packet is stored.

(Configuration of a Packet Table)

Figure 6:
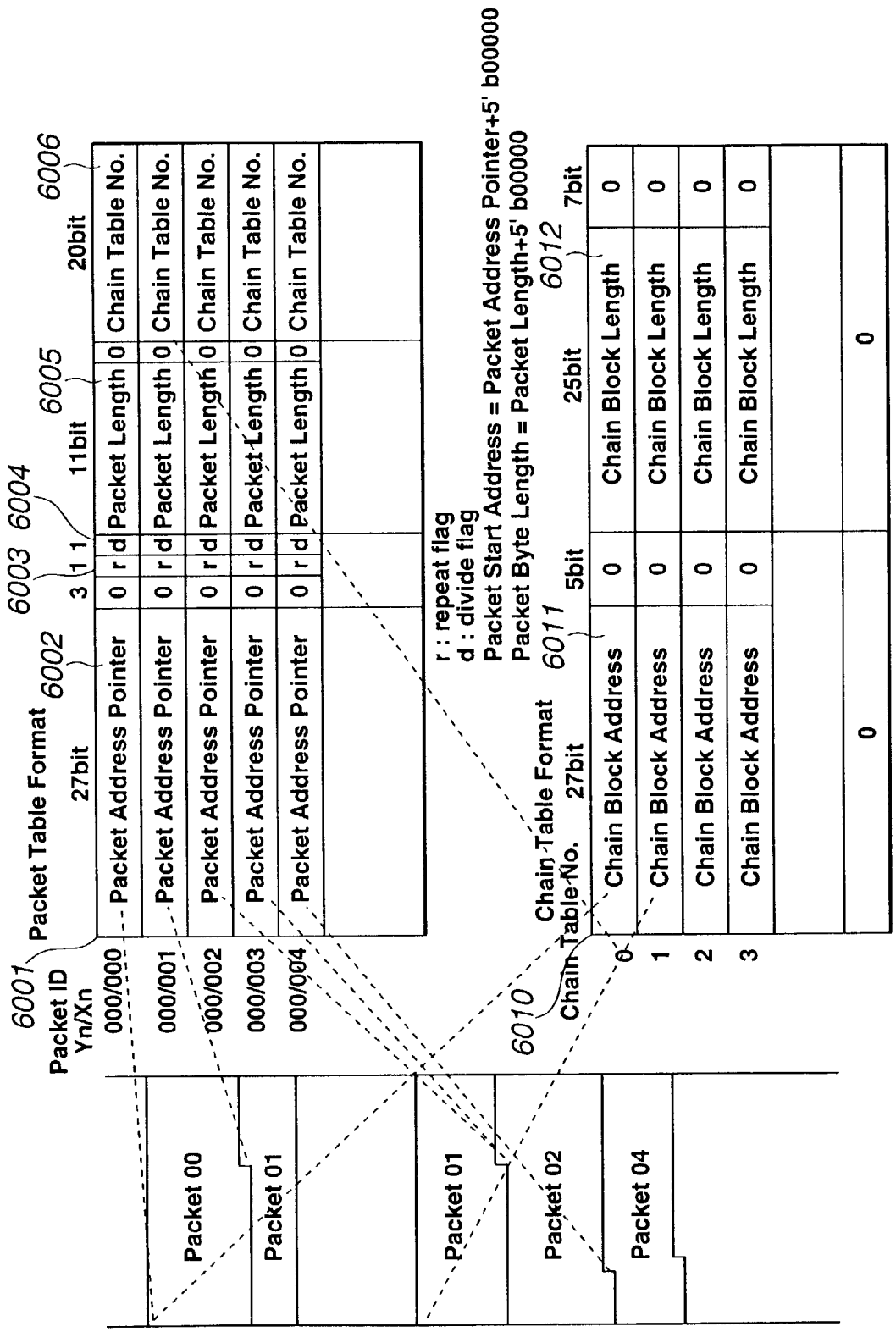
FIG. 6 is a diagram illustrating a packet table in the first embodiment.

Each of the above-described packets is managed by a packet table 6001 shown in FIG. 6. The packet table 6001 is used together with image data, and is managed in the RAM 2002 when image data is developed in the RAM 2002 shown in FIG. 3. When image data is stored in the external storage device 2004, the packet table 6001 is also stored in the external storage device 2004 simultaneously. When developing image data stored in the external storage device 2004 in the RAM 2002, the packet table 6001 is also read into the RAM 2002 simultaneously, and rewriting of address information is performed in accordance with information relating to addresses where image data is to be developed.

By adding five bits of "0" to the value of the table, the leading address of the packet (Packet Start Address) 6002, and the length of bytes of the packet (Packet Byte Length) 6005 are obtained. That is, Packet Address Pointer (27 bits)+5b00000=Packet Start Address, and PacketLength (11 bits)+5b00000=Packet Byte Length. The packet table 6001 and a chain table 6010 are not separated. The packet table 6001 is always arranged in the scanning direction, such as Yn/Xn=000/000, 000/001, 000/002, - - - . An entry in the packet table 6001 uniquely indicates one tile. An entry next to Yn/Xmax is Yn+1/Xo.

When a packet is entirely the same data as the immediately preceding packet, that packet is not written in a memory, and Packet Address Pointer and Packet Length that are the same as for the first entry are stored in an entry in the packet table. That is, one packet data is indicated by two table entries. In this case, Repeat Flag 6003 of the second table entry is set. When a packet is divided into a plurality of portions by a chain DMA, Divide Flag 6004 is set, and the chain-table number 6006 of the chain block where the leading portion of the packet is present is set. Entries of the chain table 6010 are Chain Block Address 6011 and Chain Block Length 6012. At the last entry of the table 6010, 0 is stored in each of Chain Block Address 6011 and Chain Block Length 6012.

[Image Input/Output Processing]

Figure 7:
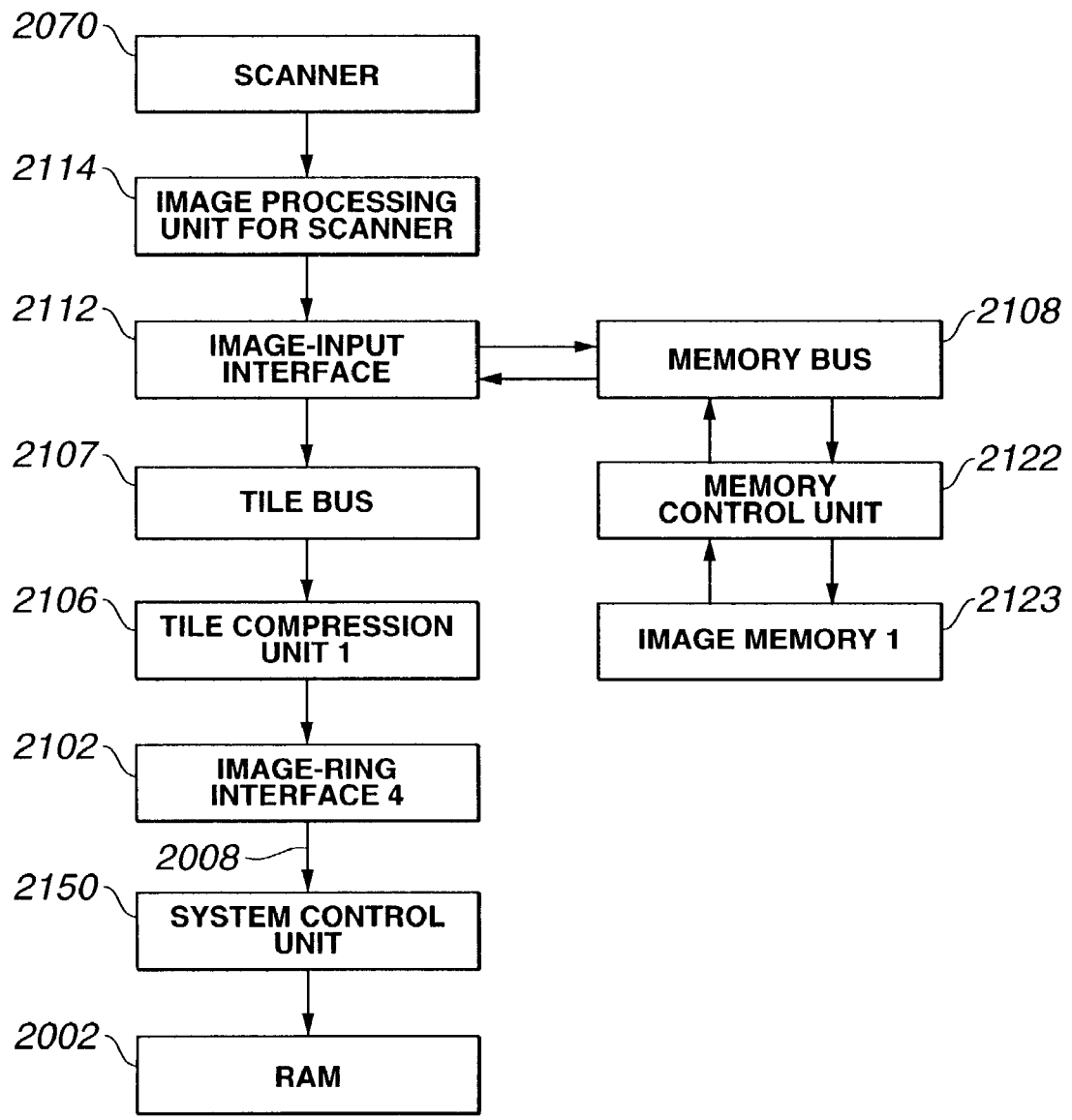
FIG. 7 is a diagram illustrating the path of data between blocks relating to image output processing.

Next, image input/output processing in the first embodiment will be described in detail. First, a description will be provided of image input processing in which tile-image data is generated from image data read by the scanner 2070, and is stored in the RAM 2002. FIG. 7 illustrates the path of data between blocks relating to this processing. In the following description, it is recommended to refer to FIG. 7 in addition to the block diagrams shown in FIGS. 2A–2C.

First, an image is read by the scanner 2070. In order to set a reading operation and the like, the command processing unit 2104 analyzes the above-described command packet received from the system control unit 2150, and outputs a setting signal to an image input interface and the like. Image data of the read image is sequentially transferred to the image processing unit 2114 for the scanner as raster data. The image processing unit 2114 for the scanner performs necessary image processing in the order of raster data, and transfers resultant data to the image-input interface 2112. The image-input interface 2112 transfers the image data transferred in the order of a raster to the memory control unit 2122 via the memory bus 2108.

The memory control unit 2122 develops the transferred data in the image memory 1 2123 in the form of a raster. The image memory 1 2123 stores raster data for 32 lines as the minimum capacity. When image data for 32 lines has been developed in the image memory 1 2123, the image-input interface 2112 starts reading in units of tile-image data for 32 pixels×32 lines. This reading of the tile-image data is performed via the memory control unit 2122 and the memory bus 2108. Then, the image-input interface 2112 generates data packets from the tile-image data in the format shown in FIG. 3. Then, the image-input interface 2112 requests connection to the tile compression unit 1 2106 from the tile bus 2107. After being connected to the tile compression unit 1 2106 by the tile bus 2107, the image-input interface 2112 transfers the data packets to the tile compression unit 1 2106.

The tile compression unit 1 2106 performs JPEG compression of the data packets. The data packets subjected to JPEG compression are transferred to the image-ring interface 4 2102. The image-ring interface 4 2102 transfers the data packets to the system control unit 2150 via the image ring 2008.

The system control unit 2150 stores the transferred compressed data packets in the RAM 2002. At that time, the CPU 2001 generates a packet table 6001 corresponding to the stored data packets, and stores the generated packet table 6001 in the RAM 2002. Thus, the data packets are formed from the image read by the scanner 2070, and are stored in the RAM 2002 of the system control unit 2150 after being subjected to data compression.

Next, a description will be provided of image output processing in which printing is performed by the printer 2095 based on the data packets stored in the RAM 2002 of the system control unit 2150.

Figure 8:
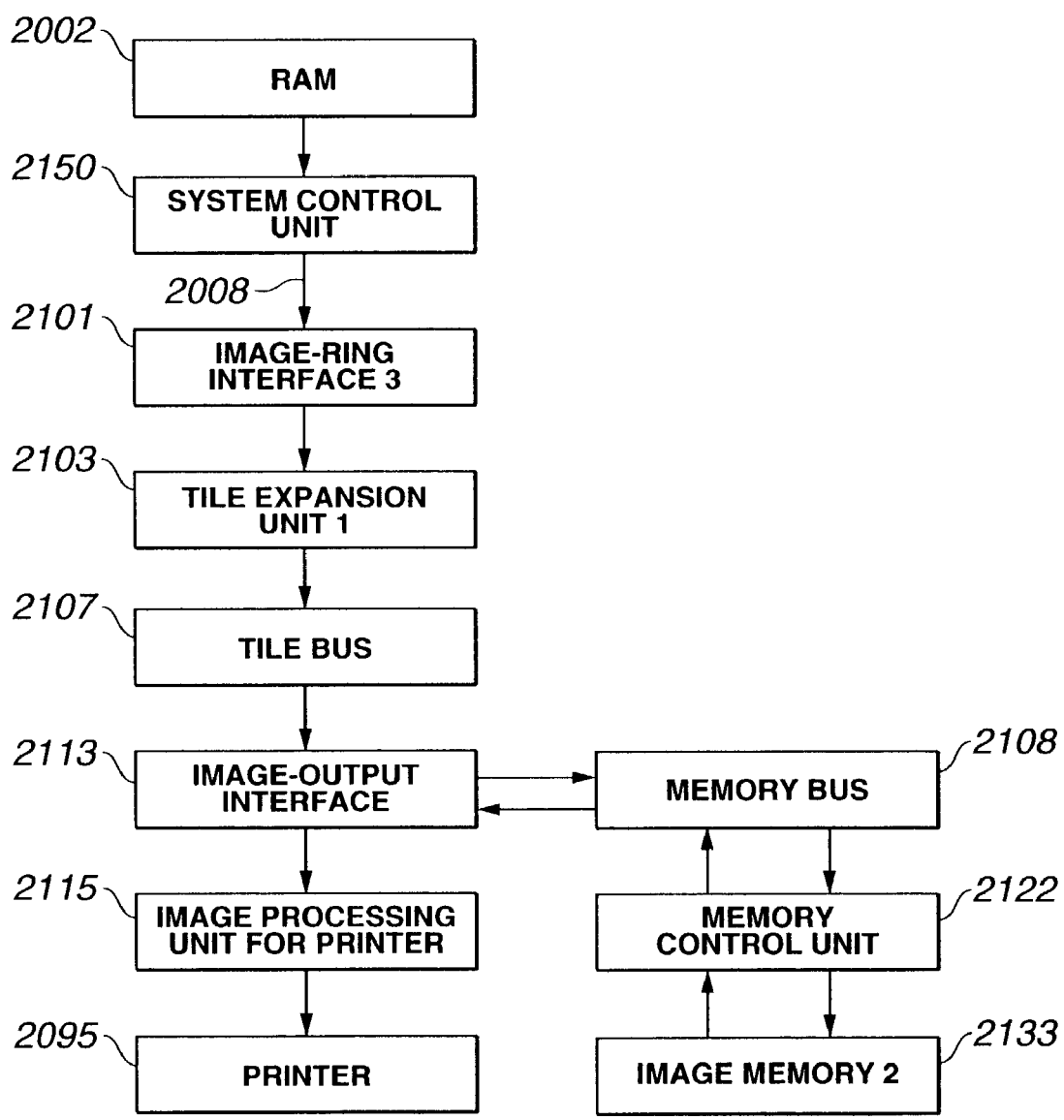
FIG. 8 is a diagram illustrating the path of data between blocks relating to image output processing.

FIG. 8 illustrates the path of data between blocks relating to this processing. In the following description, it is recommended to refer to FIG. 8 in addition to the block diagrams shown in FIGS. 2A–2C. In order to set a printing operation and the like, the command processing unit 2104 analyzes the above-described command packet received from the system control unit 2150, and outputs a setting signal to the image-output interface and the like.

First, the data packets are read from the RAM 2002 in accordance with the packet table 6001, in response to an instruction from the CPU 2001. The data packets output via the system control unit 2150 are input to the image-ring interface 3 2103 via the image ring 2008. The image-ring interface 3 2101 selects the tile expansion unit 1 2103, and transfers the data packets. The selection of the tile expansion unit 1 2103 is performed in accordance with Process Instruction 3011 in the above-described packet format.

The tile expansion unit 1 2103 performs JPEG expansion of the data packets, and converts the data packets into uncompressed image data. Then, the tile expansion unit 1 2103 requests connection to the image-output interface 2113 from the tile bus 2107. After being connected to the image-output interface 2113 by the tile bus 2107, the tile expansion unit 1 2103 transfers the data packets to the image-output interface 2113.

The image-output interface 2113 that has received the data packets removes a header from each of the data packets via the memory bus 2108, and transfers resultant tile-image data to the memory control unit 2122. The memory control unit 2122 develops the transferred tile-image data in the image memory 2 2123. This development is performed in units of a tile, in the form of raster data within the image memory 2 2123.

When the raster data has been entirely developed as raster data for 32 lines to be output from the printer 2095, the image-output interface 2113 starts data reading in the order of the raster. This reading of the raster data is performed via the memory control unit 2122 and the memory bus 2108. The image-output interface 2113 that has read the data in the order of the raster transfers the read data to the image processing unit 2115 for the printer 2075. The printer 2095 that has received the raster data performs printing based on the raster data.

In the first embodiment, by combining the above-described image input processing and image output processing, it is possible to perform image input/output processing in which an image read by the scanner 2070 is printed, i.e., copying processing. At that time, the digital composite apparatus 1001 reads the image using the scanner 2070, performs data compression (JPEG compression) of data packets generated from the read image, and stores the generated data packets in the RAM 2002 of the system control unit 2150. Then, processing, in which, after performing data expansion (JPEG expansion) of the data packets stored in the RAM 2002, the data packets are converted into raster data, and the obtained raster data is printed by the printer 2095, is performed.

[Image Processing Using Data Packets]

Next, image processing using data packets will be described in detail. In the first embodiment, image data for one page is divided into portions having a size to allow easy processing in parallel, i.e., tile-image data. Then, as shown in FIG. 3, image processing is performed in units of a data packet including divided tile-image data 3002, header information 3002 including attribute information, and additional image information 3003.

Figure 9:
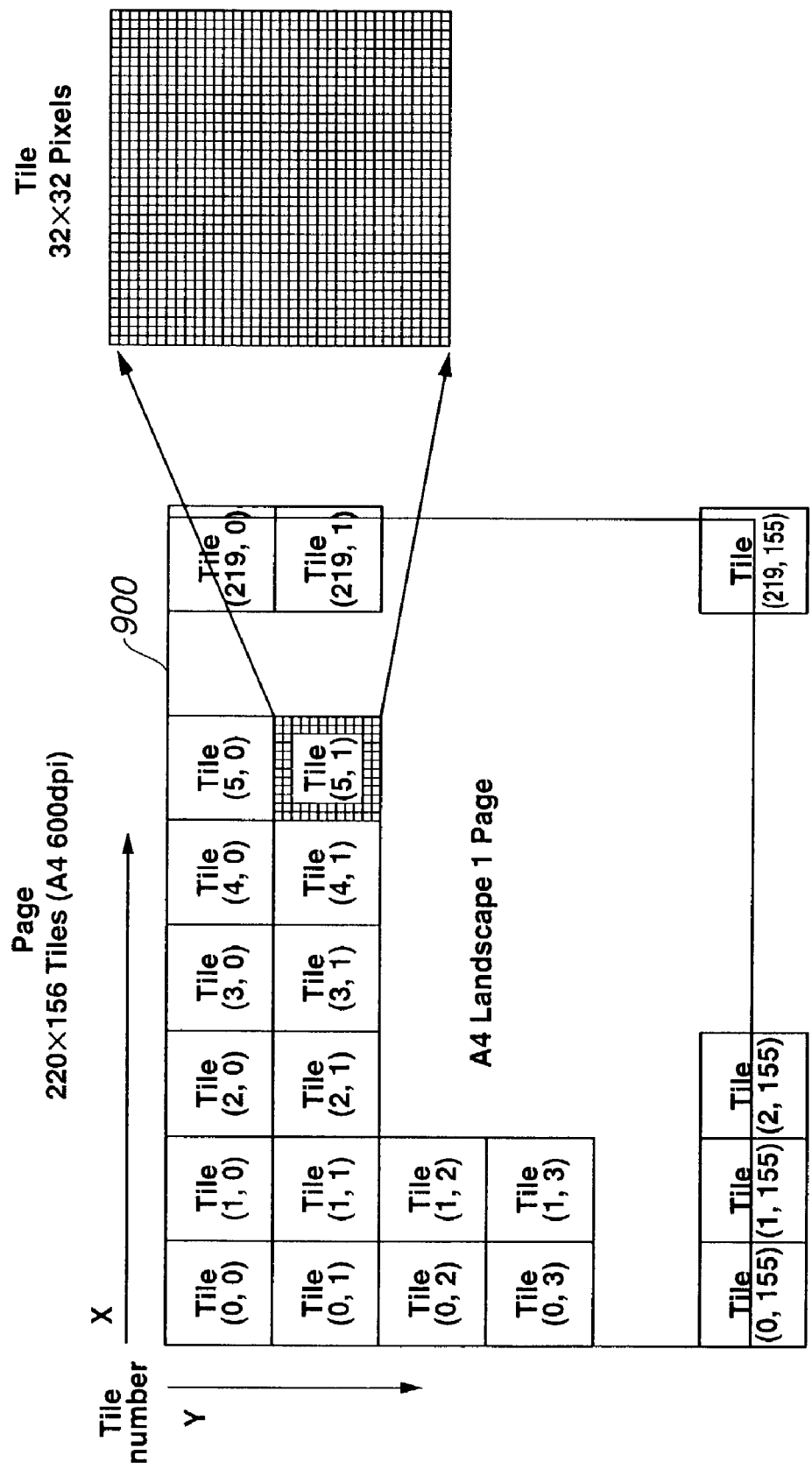
FIG. 9 is a diagram illustrating an example of dividing image data for one page into tile-image data.

FIG. 9 illustrates an example in which image data for one page is divided into tile-image data. As shown in FIG. 9, image data 900 for one page input from the scanner 2070, the LAN 2001 or the like as raster-image data is divided into tile-image data by the CPU 2001. Each tile region has a size of 32 pixels in the vertical direction and 32 pixels in the horizontal direction. Tile-image data is generated for each region. If it is assumed that an A4-size original is read by the scanner unit 2070 with a resolution of 600×600 dpi (dots per inch), and the read image is divided into tiles of 32×32 pixels, then 34,320 sets of tile-image data are generated from the A4-size original.

Connection of tile-image data to page-image data (to be described later) indicates that an image for one page is again generated by connecting sets of tile-image data that have been individually dealt with, so as to be arranged in the order of the positions (coordinates) of respective tiles indicated within parentheses in respective tiles shown in FIG. 9. The CPU 2001 can execute the above-described functions of dividing and connecting image data, by software using the RAM 2002 or the like. In the first embodiment, the image-data-form conversion unit 2200, serving as a principal unit of the first embodiment, can also execute the above-described functions of dividing and connecting image data by hardware. The image correction and division data resulting from this software execution by the CPU are in a format that is compatible with image data resulting from performance of these functions by hardware.

By generating data packets from image data stored in the RAM 2002, and transferring the generated data packets to the image processing unit 1 2149, the CPU 2001 can perform desired image processing for the image data. For example, the CPU 2001 can perform image processing A and image processing B shown in processing paths of FIGS. 10 and 11, respectively.

Image processing A (see FIG. 10): Processing of performing binary-encoding processing and rotation processing for image data stored in the RAM 2002, and again storing resultant data in the RAM 2002 is performed. In this case, the CPU 2001 writes IDs of respective units and the contents of processing Mode in Process Instruction 3011 in the order of the tile expansion unit 1 (or 2) 2103, the binary-encoding unit 2118, the image rotation unit 2030 and the tile compression unit 1 2106. The data packets transferred to the image processing unit 1 2149 are transferred in accordance with the above-described Process Instruction 3011 in the order of the tile expansion unit 1 (or 2) 2103, the binary-encoding unit 2118, the image rotation unit 2030, the tile compression unit 1 (or 2 or 3) 2106, and are processed at the respective units. Since the processing is performed based on the header information 3001, the CPU 2001 need not perform instruction and control of processing for each processing unit while image processing is performed. Accordingly, in contrast to known pipeline processing in which a control signal must be transmitted to each processing block, load for controlling image processing is not present.

Image processing B (see FIG. 11): Processing of performing resolution conversion processing and rotation processing for image data stored in the RAM 2002, and again storing resultant data in the RAM 2002 is performed. In this case, the CPU 2001 may also write IDs of respective units and the contents of processing Mode in Process Instruction 3011 in the order of the tile expansion unit 1 (or 2) 2103, the resolution conversion unit 2118, the image rotation unit 2030 and the tile compression unit 1 2106.

Figure 12:
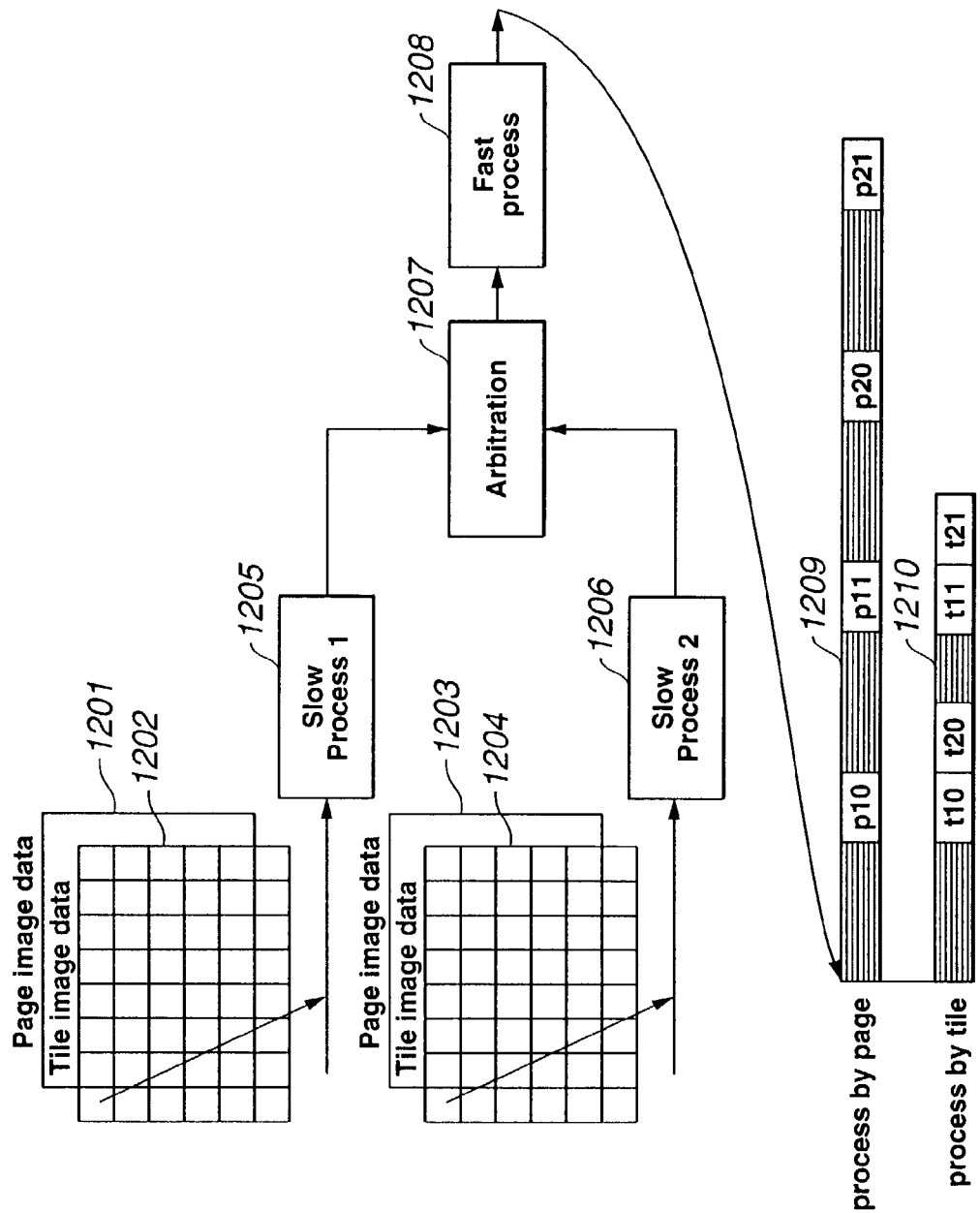
FIGS. 12 and 13 are diagrams, each illustrating an example of improvement in parallelism, and achievement of a high speed in processing in the image processing unit 1.
Figure 13:
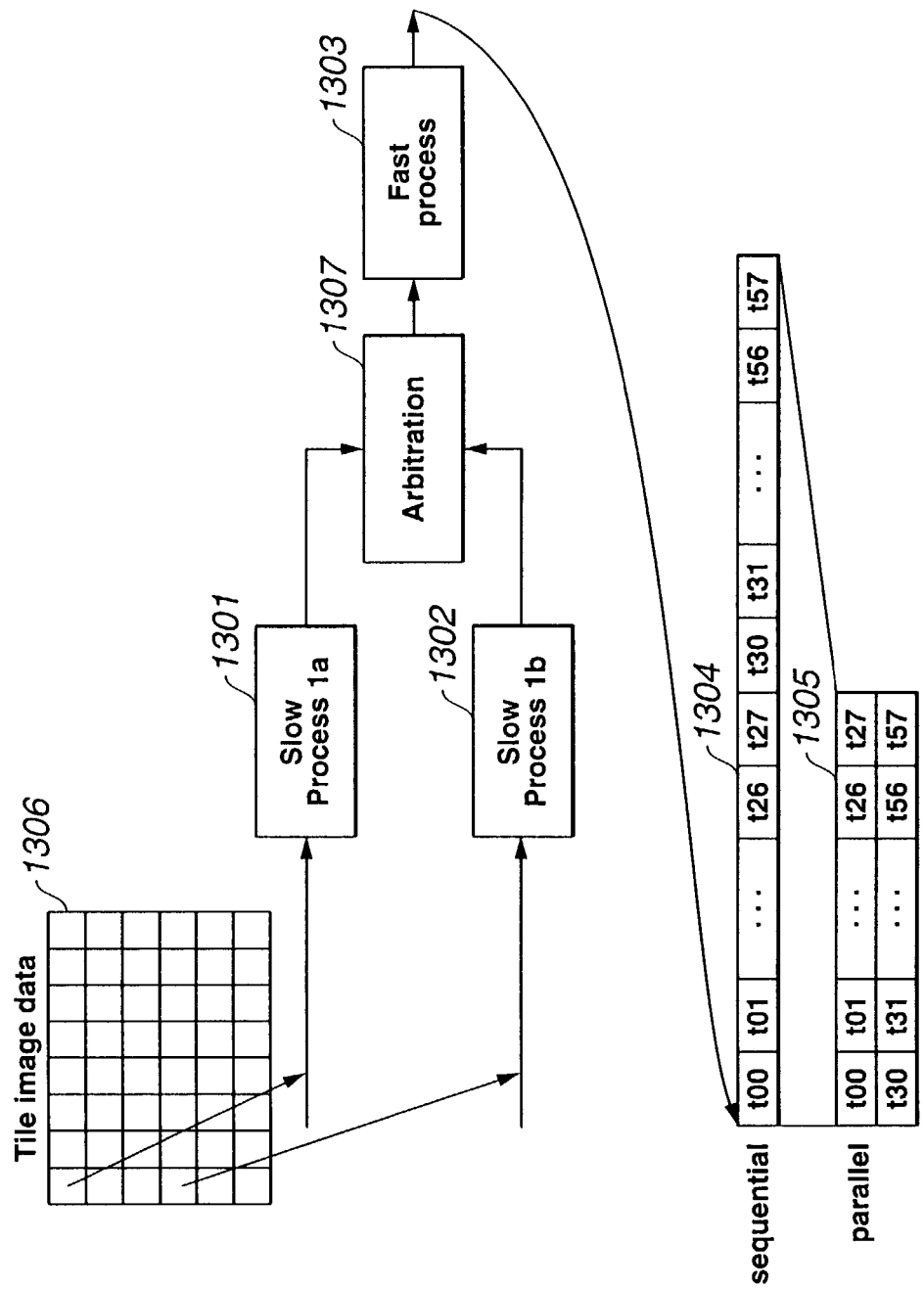

FIGS. 12 and 13 illustrate examples of improvement in parallelism, and realization of a high speed in processing in the image processing unit 1 2149 by dividing image data into sets of tile-image data. The image processing unit 1 2149 has a configuration specified for image processing of image data in units of a tile. In FIGS. 12 and 13, however, in order to simplify comparative description, it is assumed that the image processing unit 1 2149 can also perform image processing in units of a page.

In FIG. 12, there are shown image data 1201 and 1203 in units of a page, and image data 1202 and 1204 in units of a tile. Processes 1205, 1206 and 1208 correspond to any ones of image processing functions 2116–2119, and 2030 possessed by the image processing unit 1 2149. An arbitration unit 1207 performs arbitration when output results from the image processing functions 1205 and 1206 are transferred to the image processing function 1208. In the first embodiment, the tile bus 2107 has the function of the arbitration unit 1207.

Time flows 1209 and 1210 represent cases in which the result of processing output from the image processing function 1208 is processed in units of a page, and in units of a tile, respectively. In the time flow 1209, p10 and p11 indicate parts of the page-image data 1201, and p20 and p21 indicate parts of the page-image data 1203. In the time flow 1210, t10 and t11 indicate parts of the tile-image data 1202, and t20 and t21 indicate parts of the tile-image data 1204. As p10 and t10, p and t having the same number have the same amount of image data. Sets of image data 1201 and 1202 input to the image processing unit 1 2149 are processed in the order of the image processing function 1205, the arbitration function 1207 and the image processing function 1208, and are output from the image processing unit 1 2149. Similarly, sets of image data 1203 and 1204 input to the image processing unit 1 2149 are processed in the order of the image processing function 1206, the arbitration function 1207 and the image processing function 1208, and are output. At that time, it is assumed that in each of the image processing functions 1205 and 1206, a time required for obtaining output data having the same amount as input data is longer than in the image processing function 1208. If it is assumed that each image processing unit simultaneously processes data in units of a page, then, as shown in the time flow 1209, the image processing function 1208 cannot receive the next data until processing for one page is terminated, and therefore cannot perform processing for the next page (p20 and p21) until processing for the concerned page (p10 and p11) is terminated.

Striped portions indicate that data is not output. On the other hand, when simultaneously processing data in units of a tile, as shown in the time flow 1210, when the first tile t10 has been processed, processing for the next tile t20 can be immediately started. Similarly, processing for t11 and t21 can be consecutively performed. Hence, the time required for completing the entire processing can be quickened compared with a case in which processing is performed in units of a page.

In FIG. 13, image processing functions 1301 and 1302 are the same as the image processing function 1205 shown in FIG. 12, and it is assumed that in each of the image processing functions 1301 and 1302, the time required for the same processing is longer than in the image processing function 1303. Time flows 1304 and 1305 represent results of processing output from the image processing function 1303 when processing is performed only by the image processing function 1301, and by using both of the image processing functions 1301 and 1302, respectively. As shown in FIG. 13, when using a plurality of same image processing units for processing for the same page, by performing image processing using tile-image data, high-speed processing can be easily achieved.

For example, when performing parallel processing of the above-described image processing A and image processing B using the image processing unit 1 2149, conflict in rotation processing sometimes occurs in the image rotation unit 2030.

However, if it is assumed that image data A, image data B, the binary-encoding unit 2118, the resolution conversion unit 2118 and the image rotation unit 2030 correspond to the tile-image data 1202, the tile-image data 1204, the image processing function 1205, the image processing function 1206 and the image processing function 1208 shown in FIG. 12, respectively, continuous processing of two sets of image data in the image rotation unit 2030 can be performed even during conflict. Accordingly, the time for completing entire processing can be shortened compared with a case of performing processing in units of a page.

Similarly, when performing only the image processing A, if it is assumed that the image data A, the tile expansion unit 1 2103, the tile expansion unit 2 2013 and the binary-encoding unit 2118 correspond to the tile-image data 1306, the image processing function 1301, the image processing function 1302 and the image processing function 1303 shown in FIG. 13, respectively, high-speed processing can be easily achieved by performing expansion processing in units of tile-image data.

[Image Processing Using the Image-Data-Form Conversion Unit]

When the digital composite apparatus of the present invention has the network configuration shown in FIG. 1, data transfer is performed by connecting the digital composite apparatus of the present invention that performs processing in units of a packet to another image processing apparatus that performs processing in units of a page. Accordingly, in the image-processing-apparatus controller shown in FIGS. 2A–2C, image data in units of a page received from a network via the LAN 2001 must be subjected to some operations, such as division of the image data into tile-image data, addition of header information for providing packets, and the like, after receiving the image data. Furthermore, when transmitting image data, tile-image data constituting data packets must be converted into page-image data.

As an easy approach, the CPU 2001 may perform software processing. However, if the amount of data is large, a considerable processing performance is used for this operation. For example, when receiving image data B via facsimile communication while image data is being transmitted via a network, the CPU 2001 must execute processing for converting the image data A in the form of packets into page-image data and packet processing relating to the image data B in parallel. Accordingly, the load of the CPU 2001 increases, resulting in slower facsimile output than in an ordinary case.

In the first embodiment, by providing the image-data-form conversion unit 2200 having a function of dividing page-image data into tile-image data, a function of generating data packets by adding header information to tile-image data, a function of generating tile-image data by deleting header information from data packets, a function of connecting tile-image data to page-image data, and a function of generating a management table for data packets in the PCI bus 2143, the above-described problems are solved. The details of the image-data-form conversion unit 2200 will now be described.

Figure 14:
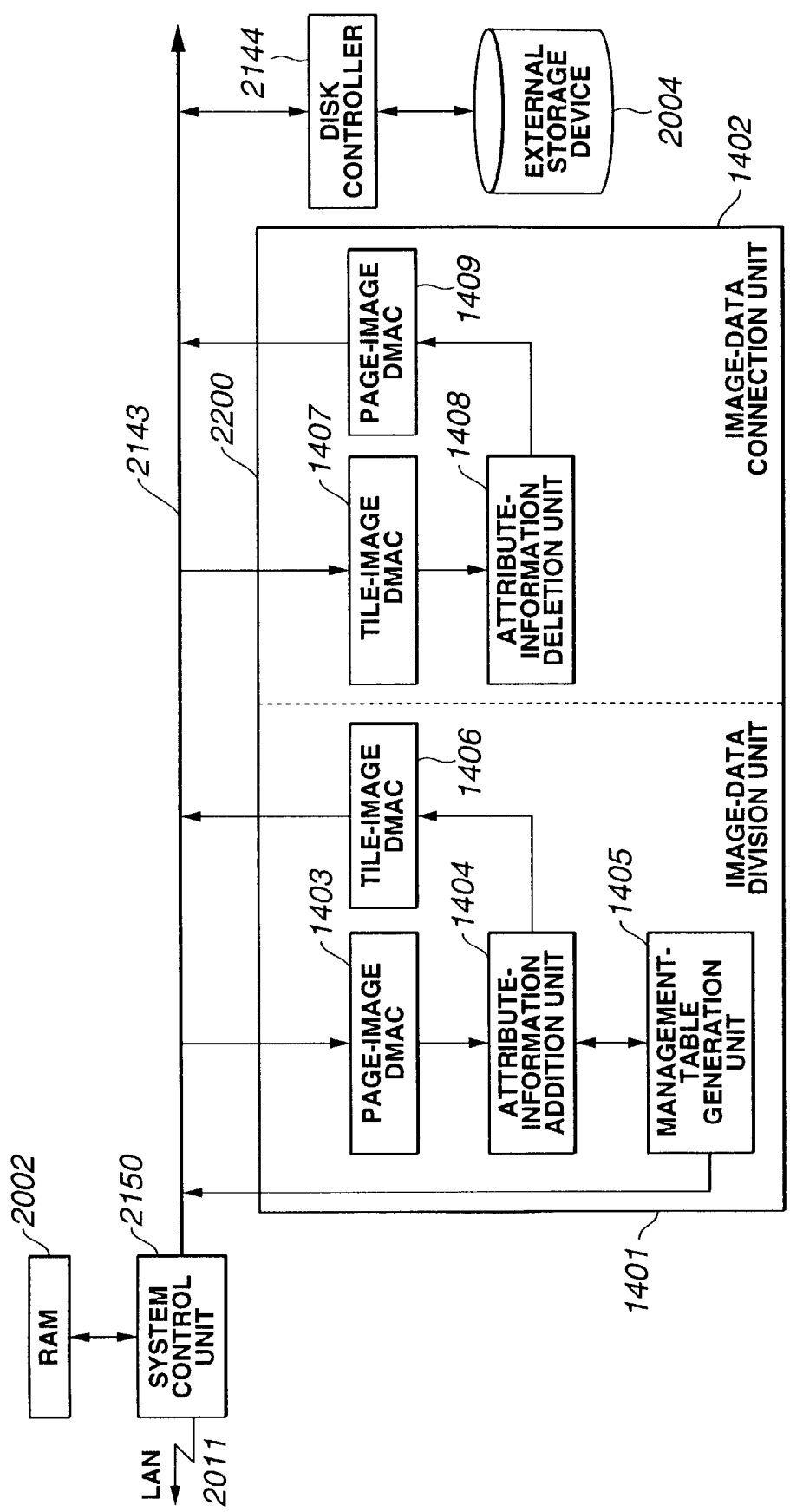
FIG. 14 is a diagram illustrating the internal configuration of an image-data-form conversion unit shown in FIG. 2A.

FIG. 14 is a diagram illustrating the internal configuration of the image-data-form conversion unit 2200 according to the first embodiment. As described above, the image-data-form conversion unit 2200 is connected to the PCI bus 2143, and has the form of a card. Although each of the following blocks is to be configured by ASIC (application specific integrated circuit) hardware, a part of process functions (for example, a management-table generation function) of the block may be realized by software.

The image-data-form conversion unit 2200 includes an image-data division unit 1401 and an image-data connection unit 1402. The image-data division unit 1401 executes a function of dividing image data in units of a page into tile-image data, and a function of generating data packets from the tile image. In order to execute these functions, the image-data division unit 1401 includes a page-image DMAC (direct memory access controller) 1403, an attribute-information addition unit 1404, a management-table generation unit 1405 and a tile-image DMAC 1406. The image-data division unit 1401 also executes a function of obtaining tile-image data by removing header information from data packets, and a function of connecting tile-image data to image data in units of a page. In order to execute these functions, the image-data division unit 1401 includes a tile-image DMAC 1407, an attribute-information deletion unit 1408 and a page-image DMAC 1409.

Figure 15:
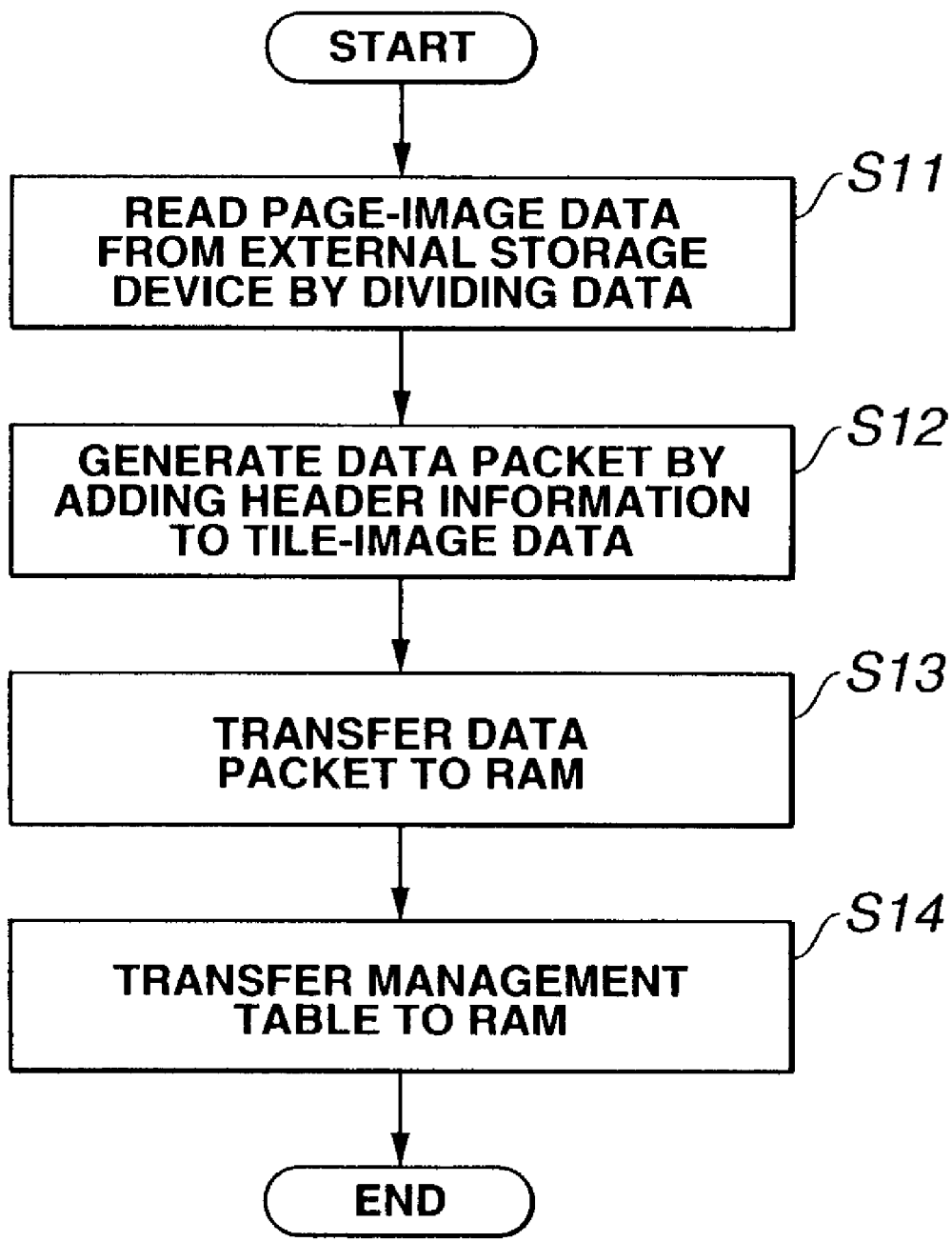
FIG. 15 is a flowchart illustrating tile-image-data generation processing and data-packet generation processing in the image-data-form conversion unit shown in FIG. 14.

Next, a description will be provided of processing for generating data packets in units of a tile from image data in units of a page in the image-data-form conversion unit 2200, with reference to FIG. 15. The processing procedure of the flowchart shown in FIG. 15 is controlled by a CPU (not shown) provided in the image-data-form conversion unit 2200. This CPU can communicate various types of control information with the CPU 2001. First, the page-image DMAC 1403 reads image data in units of a page stored in the external storage device 2004 connected via the PCI bus 2143. The page-image DMAC 1403 calculates an address for each size of divided tile-image data shown in FIG. 9, and reads image data for the divided tile-image data (step S11).

Image data read by the page-image DMAC 1403 by being divided into data in units of a tile is transferred to the attribute-information addition unit 1404. The attribute-information addition unit 1404 generates data packets by adding header information 3001 including the position 3009, 3010 of each divided image in the page and attribute information, such as the page number 3007 and the like, as shown in FIG. 3 to tile-image data (step S12). The data packets output from the attribute-information addition unit 1404 are transferred to the tile-image DMAC 1406. The tile-image DMAC 1406 outputs the data packets to the PCI bus 1 2143. The data packets are transferred to the RAM 2002 via the PCI bus 1 2143 and the system control unit 2150 and are stored (step S13).

At that time, the management-table generation unit 1405 generates a management table for managing or knowing how tile-image data is stored in the external storage device 2004. The management table includes the leading address 6002 of each tile, and the like as shown in FIG. 6. The management-table generation unit 1405 is connected to the PCI bus 2143, and transmits the generated management table to the RAM 2002 (step S14). The management-table generation unit 1405 also can refer to a management table in the RAM 2002.

Figure 16:
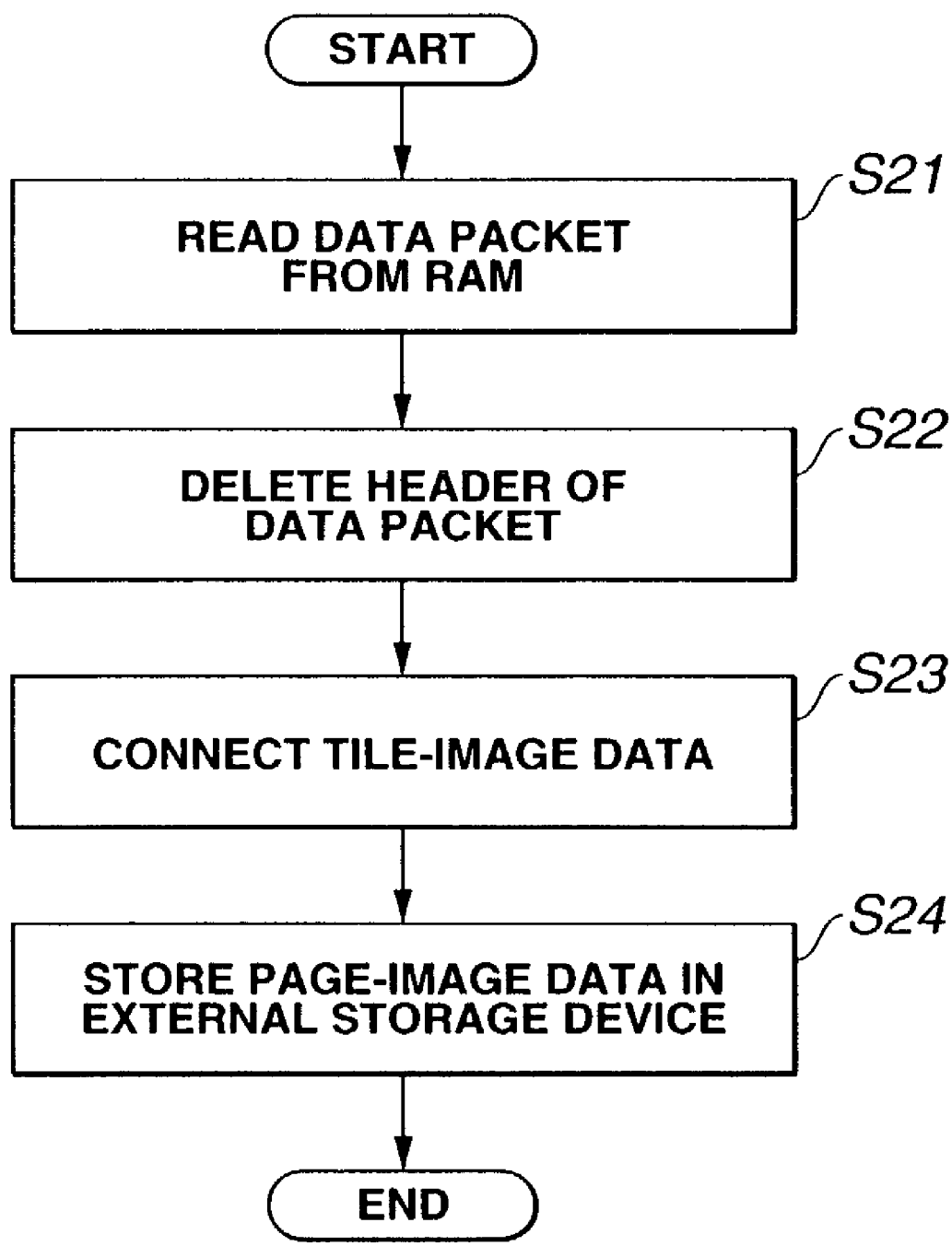
FIG. 16 is a flowchart illustrating header deletion processing and page-image-data generation processing in the image-data-form conversion unit shown in FIG. 14.

Next, a description will be provided of processing for removing the header from the data packets and returning the tile-image data into image data in units of a page in the image-data-form conversion unit 2200, with reference to FIG. 16.

The processing procedure of the flowchart shown in FIG. 16 is controlled by a CPU (not shown) provided in the image-data-form conversion unit 2200.

First, the tile-image DMAC 1407 acquires a management table present in the RAM 2002 connected via the PCI bus 2143, and refers to the acquired management table. Then, the tile-image DMAC 1407 reads data packets from the RAM 2002 based on the management table (step S21). The read tile-image data is transmitted to the attribute-information deletion unit 1408, which removes the header information 3001 (step S22). The page-image DMAC 1409 calculates addresses so that an image in units of a page is obtained from the tile-image data (step S23), and stores the image data in the external storage device 2004 (step S24).

Figure 17:
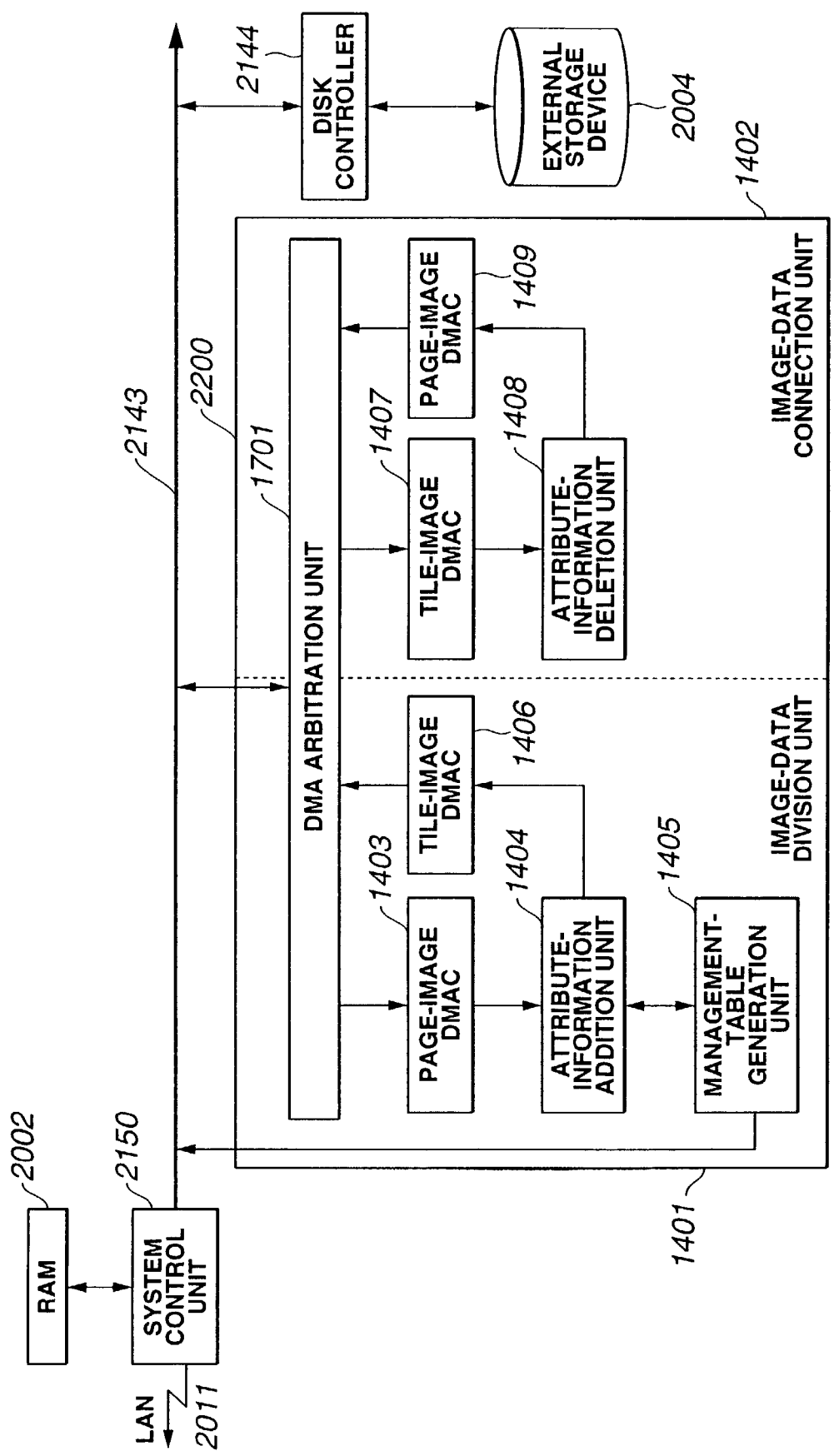
FIG. 17 is a block diagram illustrating a configuration in which a DMA arbitration unit is provided in the image-data-form conversion unit shown in FIG. 14.

The processing of generating tile-image data by dividing image data in units of a page and generating data packets by adding attribute information to the generated tile-image data, and the processing of returning the tile-image data into image data in units of a page by removing the headers from the data packets, based on the configuration shown in FIG. 14 has been described. Although in FIG. 14, a configuration in which the four DMCs are directly connected to the PCI bus 2143, arbitration of the DMACs may be performed by providing, as shown in FIG. 17, a DMA arbitration unit 1701 and only one interface unit. It is thereby possible to reduce the number of pins used for connection and data transfer between the PCI bus 2143 and the image-data-form conversion unit 2200, and reduce the cost.

As described above, in the first embodiment, an image-data-form conversion unit is connected to a general-purpose bus in a composite-apparatus controller. Furthermore, the image-data-form conversion unit generates tile-image data by dividing image data in units of a page used in the composite-apparatus controller, and also generates an image in units of a page by connecting tile-image data.

Accordingly, in contrast to a case in which a CPU of a controller divides and restores image data by software processing, by automatically performing these processes by hardware, the load of software processing can be reduced in a situation in which a plurality of sets of processing must be performed by software of a controller. As a result, the performance of the entire system can be improved. Since the image-data-form conversion unit generates data packets by adding header information including coordinate information and the like to tile-image data, extracts tile-image data from the data packets, and generates a management table, the load of software processing can be reduced. Furthermore, by connecting the image-data-form-conversion unit to a general-purpose bus, such as a PCI bus or the like, it is possible to mount the unit as an expansion card detachably mountable in a controller, and use the unit as an option when intending to increase the processing speed.

(Second Embodiment)

Figure 18:
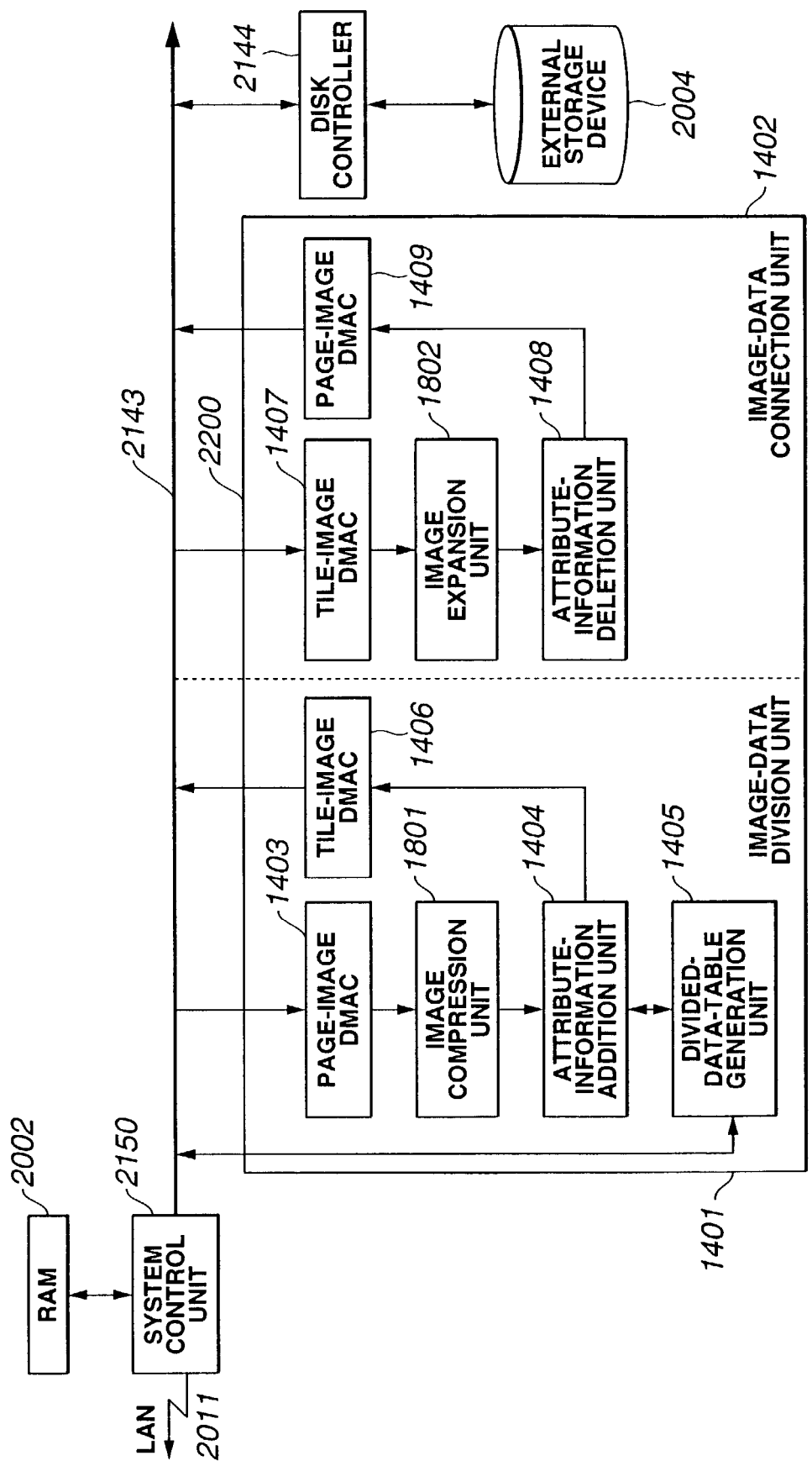
FIG. 18 is a block diagram illustrating a configuration in which an image compression unit and an image expansion unit are provided in the image-data-form conversion unit shown in FIG. 14, according to a second embodiment of the present invention.

FIG. 18 illustrates the internal configuration of the image-data-form conversion unit 2200, according to a second embodiment of the present invention. As shown in FIG. 18, the image-data-form conversion unit 2200 includes an image-data division unit 1401 and an image-data connection unit 1402, as in the first embodiment. In the second embodiment, an image compression unit 1801 is inserted between a page-image DMAC 1403 and an attribute-information addition unit 1404, and an image expansion unit 1802 is inserted between a tile-image DMAC 1407 and an attribute-information deletion unit 1408, in contrast to the first embodiment. According to this configuration, when dividing page data not subjected to image compression into tile images, image compression can be simultaneously performed. Furthermore, when returning data divided and compressed as tile images to original uncompressed page data, expansion can be performed.

Figure 19:
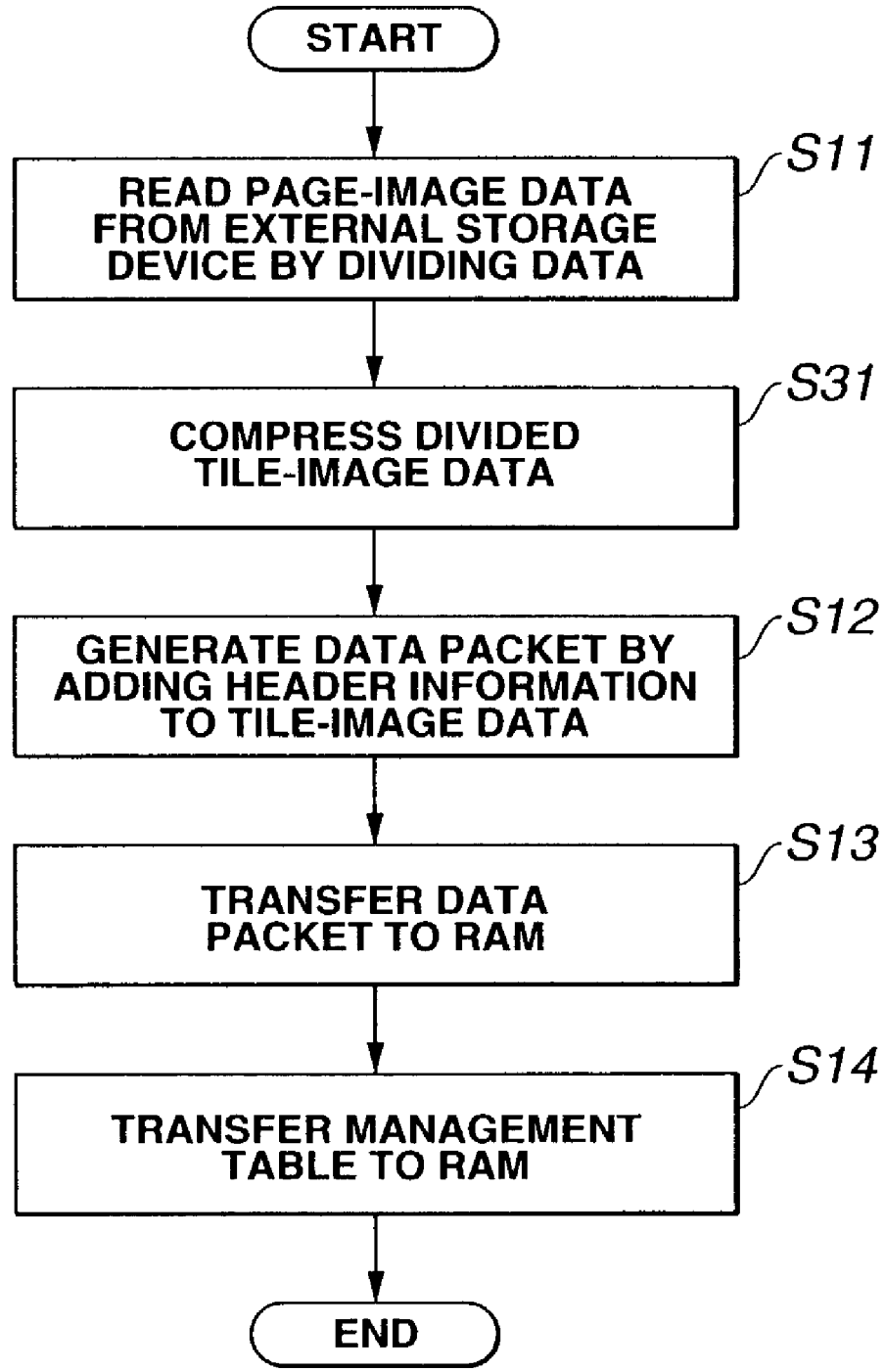
FIG. 19 is a flowchart illustrating tile-image-data generation processing and data-packet generation processing in the image-data-form conversion unit shown in FIG. 18.

FIG. 19 is a flowchart illustrating processing for generating data packets in units of a tile from image data in units of a page, in the image-data-form conversion unit 2200 having the configuration shown in FIG. 18. In this processing, the same processing as in the flowchart shown in FIG. 18 is performed, except that tile compression processing (step S31) is executed between step S11 and step S12.

Figure 20:
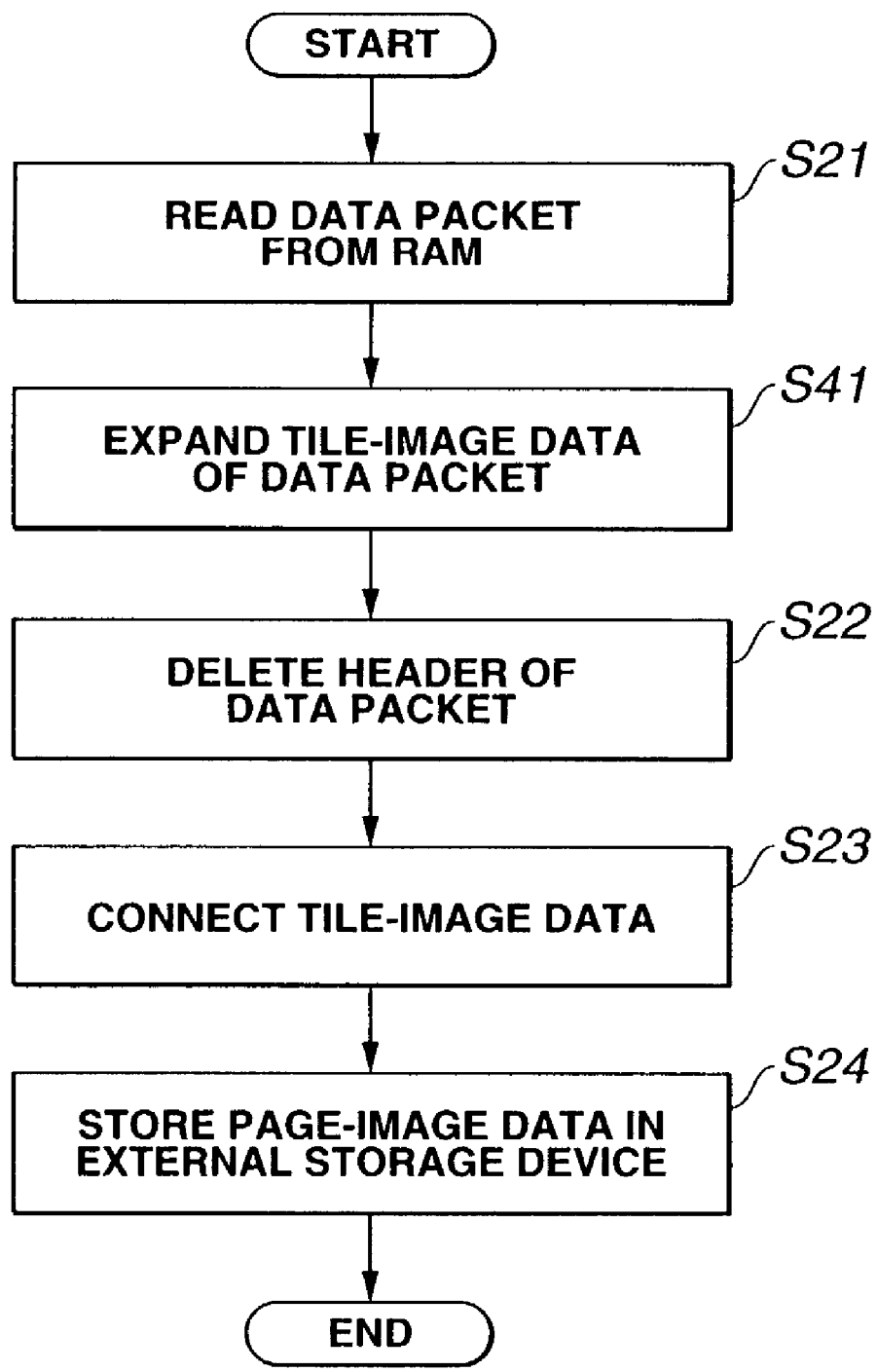
FIG. 20 is a flowchart illustrating header deletion processing and page-image-data generation processing in the image-data-form conversion unit shown in FIG. 18.
Figure 21:
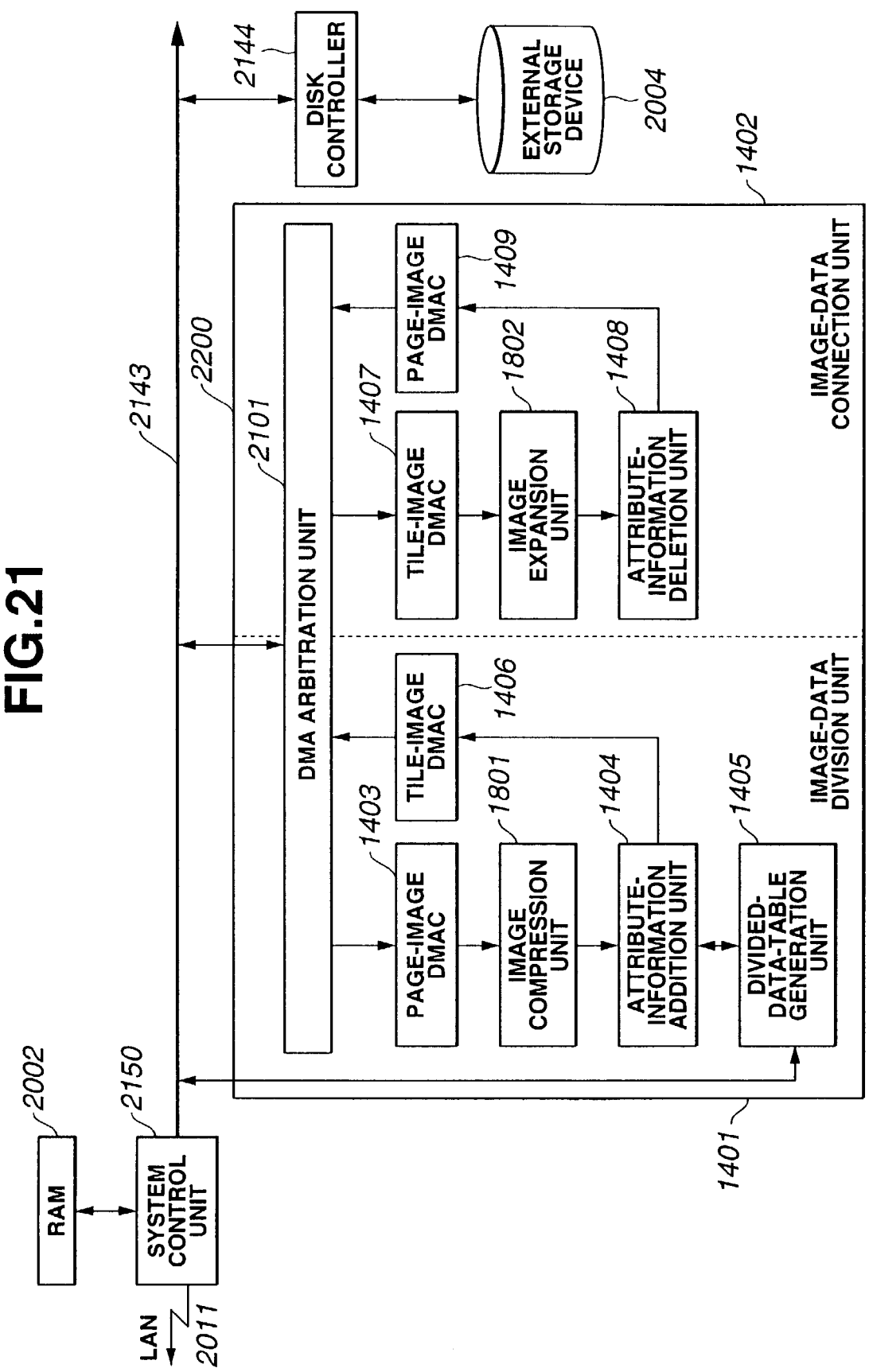
FIG. 21 is a block diagram illustrating a configuration in which a DMA arbitration unit is provided in the image-data-form conversion unit shown in FIG. 18.

FIG. 20 is a flowchart illustrating processing for returning tile-image data to image data in units of a page by removing a header from data packets, in the image-data-form conversion unit 2200 having the configuration shown in FIG. 18. In this processing, the same processing as in the flowchart shown in FIG. 16 is performed, except that tile expansion processing (step S41) is executed between step S21 and step S22. As in the first embodiment, although in FIG. 18, a configuration in which four DMACs are directly connected to a PCI bus 2143, as shown in FIG. 21, arbitration of four DMACs may be performed by providing a DMA arbitration unit 2101 and only one interface unit.

As described above, in the second embodiment, by simultaneously performing image compression when dividing image data into tile-image data, and performing image expansion when connecting the tile-image data to page-image data, it is possible to reduce the storage capacity when storing image data in an image storage unit or the like, and also reduce the amount of transferred data in a general-purpose bus or the like.

(Third Embodiment)

Figure 22:
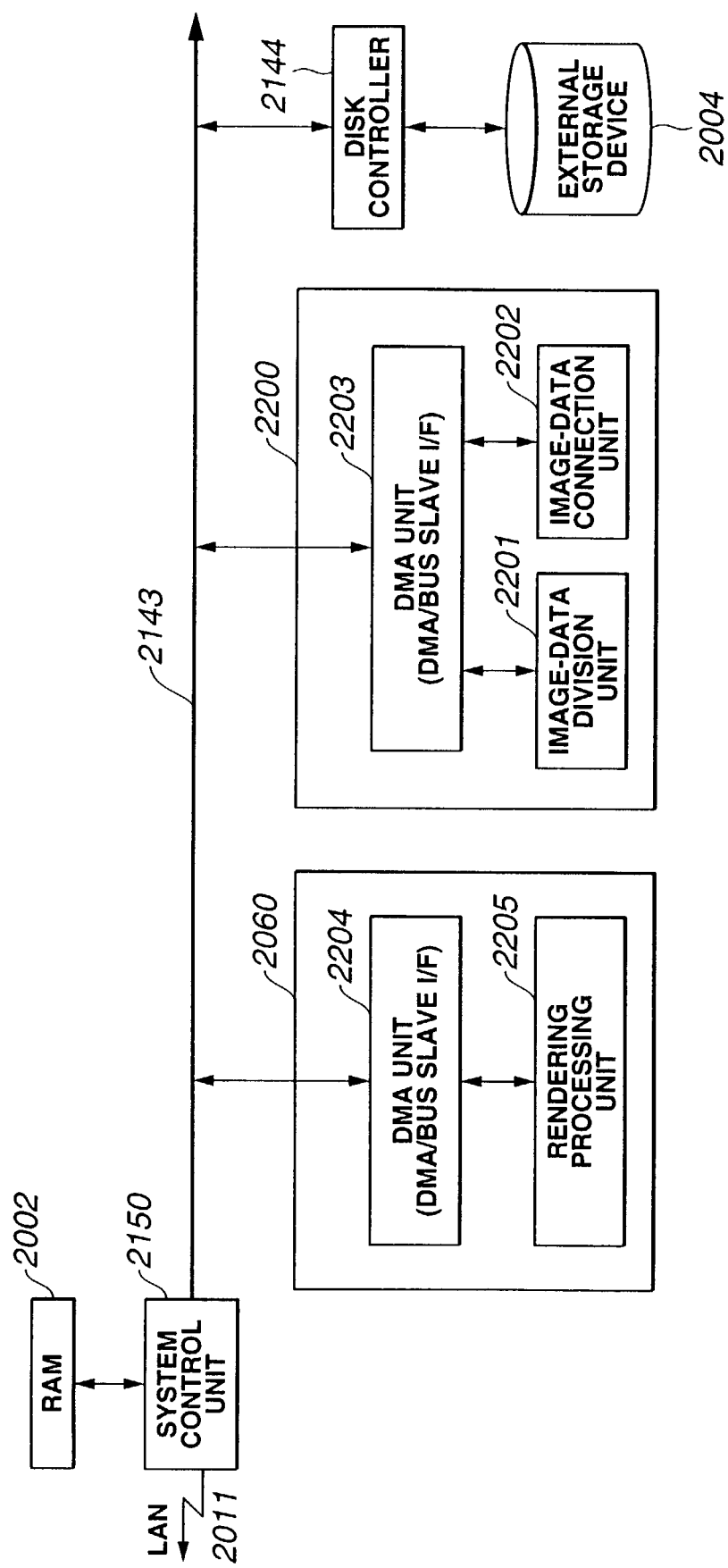
FIG. 22 is a block diagram illustrating processing performed when the image-data-form conversion unit is used for rendering processing, according to a third embodiment of the present invention.

In a third embodiment of the present invention, a description will be provided of tile-image-data processing when outputting printing data received from an external apparatus by the printer unit 2095 of the digital composite apparatus. FIG. 22 illustrates an image-data conversion unit 2200 and a rendering unit 2060 in the third embodiment. In FIG. 22, reference numeral 2200 represents a block in which the internal configuration of the image-data-form conversion unit described in the second embodiment is illustrated in a simplified form.

An image-data division unit 2201 incorporates a configuration in which the DMAC is removed from the image-data division unit 1401. Similarly, an image-data connection unit 2202 incorporates a configuration in which the DMAC is removed from the image-data connection unit 1402. Each of the image-data division unit 2201 and the image-data connection unit 2202 may include a compression/expansion unit as described in the second embodiment. Reference numeral 2203 represents a general-purpose bus slave I/F or DMAC (hereinafter termed a "DMA unit) of the image-data-form conversion unit 2200. The DMA unit 2203 incorporates a page-image DMAC 1203, a tile-image DMAC 1206, a tile-image DMAC 1207 and a page-image DMAC 1209. Within the DMA unit 2203, a bus arbitration unit as described in the first embodiment may be provided.

Reference numeral 2060 represents a block illustrating the internal configuration of the rendering unit. Reference numeral 2204 represents a general-purpose bus slave I/F or DMAC (hereinafter termed a "DMA" unit). A rendering processing unit 2205 receives printing data transmitted from the outside, and generates a raster image.

Next, a description will be provided of processing for generating tile-image data when outputting image data received from an external apparatus, from the printer unit 2095. First, printing data is received from an external apparatus, such as a PC (personal computer) or the like, via a LAN 2011. The received printing data is first stored in an external apparatus 2004. The DMA unit 2204 of the rendering unit 2060 sequentially reads the printing data stored in the external storage device 2004, and transmits the read data to the rendering processing unit 2205. The rendering processing unit 2205 develops the printing data (image generation data), generates raster-image data, and transmits the generated raster-image data to the DMA unit 2204.

The DMA unit 2204 transmits the raster-image data to the image-data-form conversion unit 2200. The image-data-form conversion unit 2200 performs processing for generating a tile image and processing for generating data packets, as in the first and second embodiments. The generated data packets are first stored in the RAM 2002 together with a management table. Then, the CPU 2001 sequentially reads the data packets stored in the RAM 2002, and causes the image processing unit 1 2149 to perform predetermined image processing for printing in units of a data packet. Then, the processed image data is output from the image processing unit 1 2149, and an image is formed by the printer unit 2095.

According to the above-described printing processing, it is possible to divide a page image to be output from the printer into tile images by hardware, without performing tile division processing and the like by the CPU 2001. Accordingly, when printing an image, it is also possible to reduce the load of a controller by software processing, as in the first and second embodiments.

(Fourth Embodiment)

Figure 23:
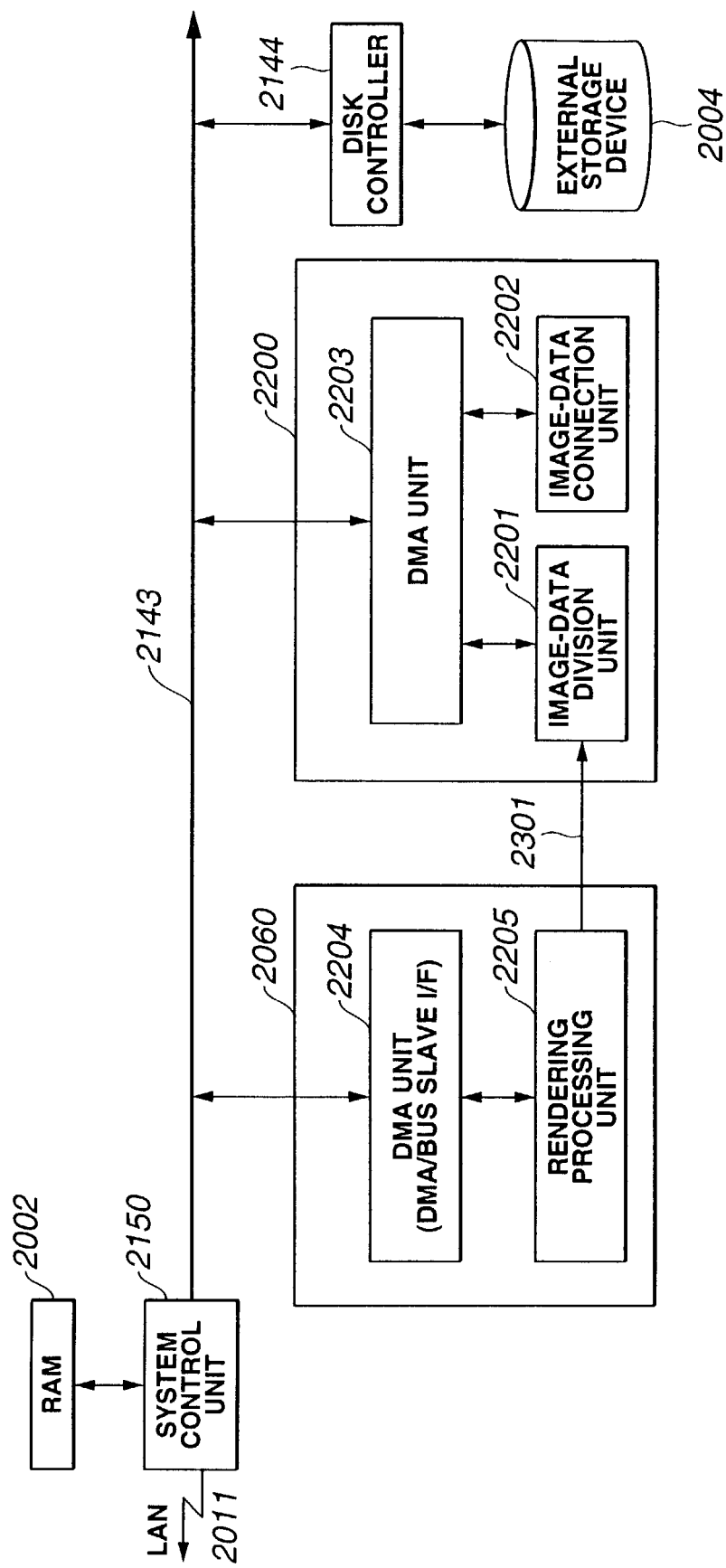
FIG. 23 is a block diagram illustrating a configuration in which a path is provided between the image-data-form conversion unit shown in FIG. 22 and a rendering processing unit, according to a fourth embodiment of the present invention.

FIG. 23 illustrates an image-data-form conversion unit 2200 and a rendering unit 2060 in a fourth embodiment of the present invention. In the fourth embodiment, a direct path 2301 from the rendering unit 2060 to an image-data division unit 2201 is added to the configuration shown in FIG. 22. It is thereby possible to reduce the ratio of occupation of a PCI bus 2143. In the configuration of the fourth embodiment, transfer of raster-image generation data (printing data), raster page-image data and data packets (tile-image data) is generated on the PCI bus 2143. However, by adopting the configuration shown in FIG. 23, transfer of raster page-image data is absent on a general-purpose bus, and higher-speed processing can be performed.

(Fifth Embodiment)

Processing in the image-data-form conversion unit 2200 has been described as an example of application of the present invention. However, the present invention is not limited to such processing, but may, of course, be applied to any other processing functional unit of the digital composite apparatus. A case of applying the present invention to a network unit will now be described as an example.

Figure 24:
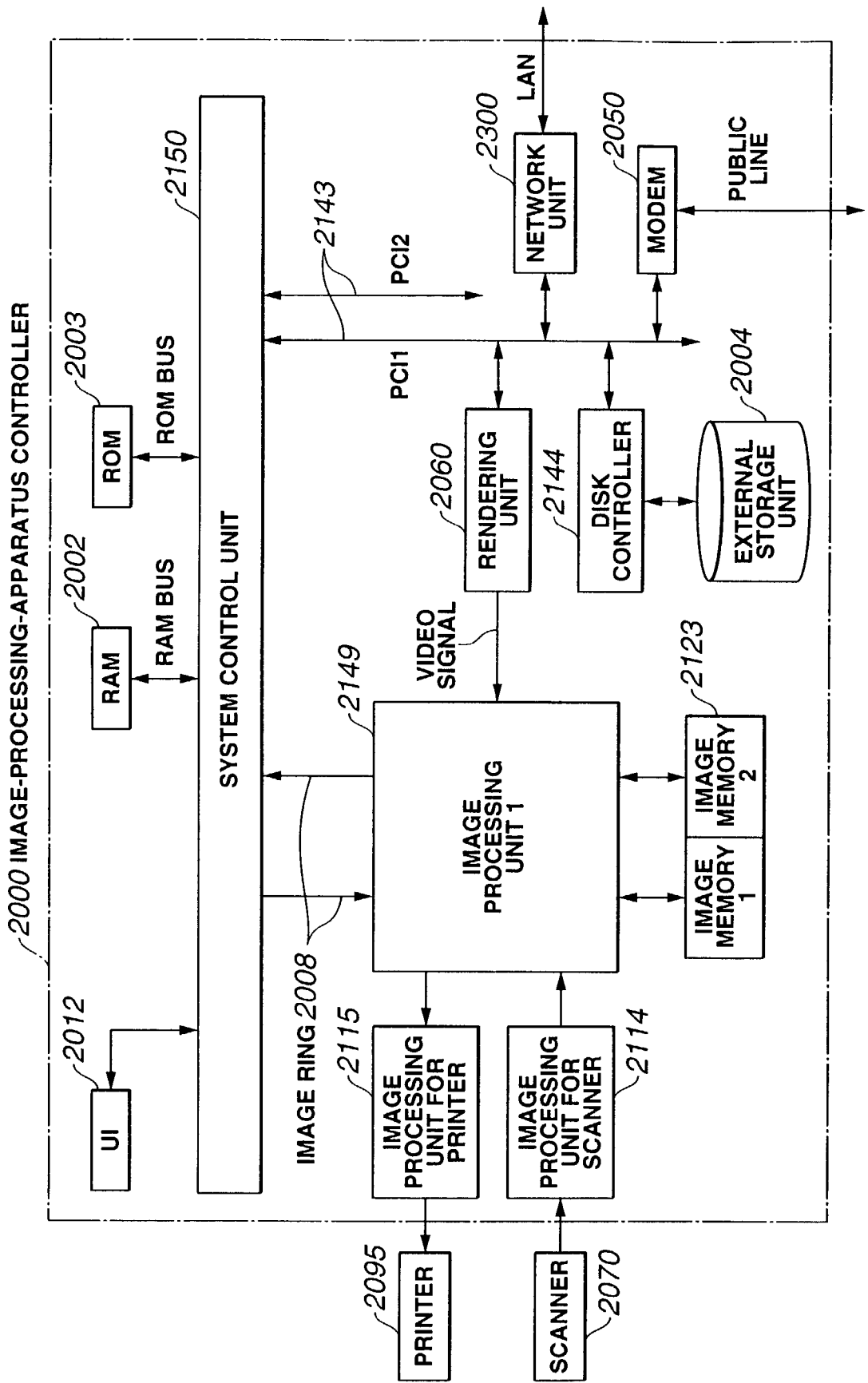
FIG. 24 is a block diagram illustrating an example of the configuration of a digital composite apparatus when the present invention is applied to a network unit, according to a fifth embodiment of the present invention.

FIG. 24 illustrates the configuration of a digital composite apparatus according to a fifth embodiment of the present invention. The internal configuration of a system control unit 2150 and an image processing unit 1 2149 is the same as the internal configuration shown in FIGS. 2A–2C, except that a network unit 2300 having a network connection function by the LAN controller 2010, the MAC 2145 and the PHY/PMD 2146, and the function of the image-data-form conversion unit 2200 is provided.

Figure 25:
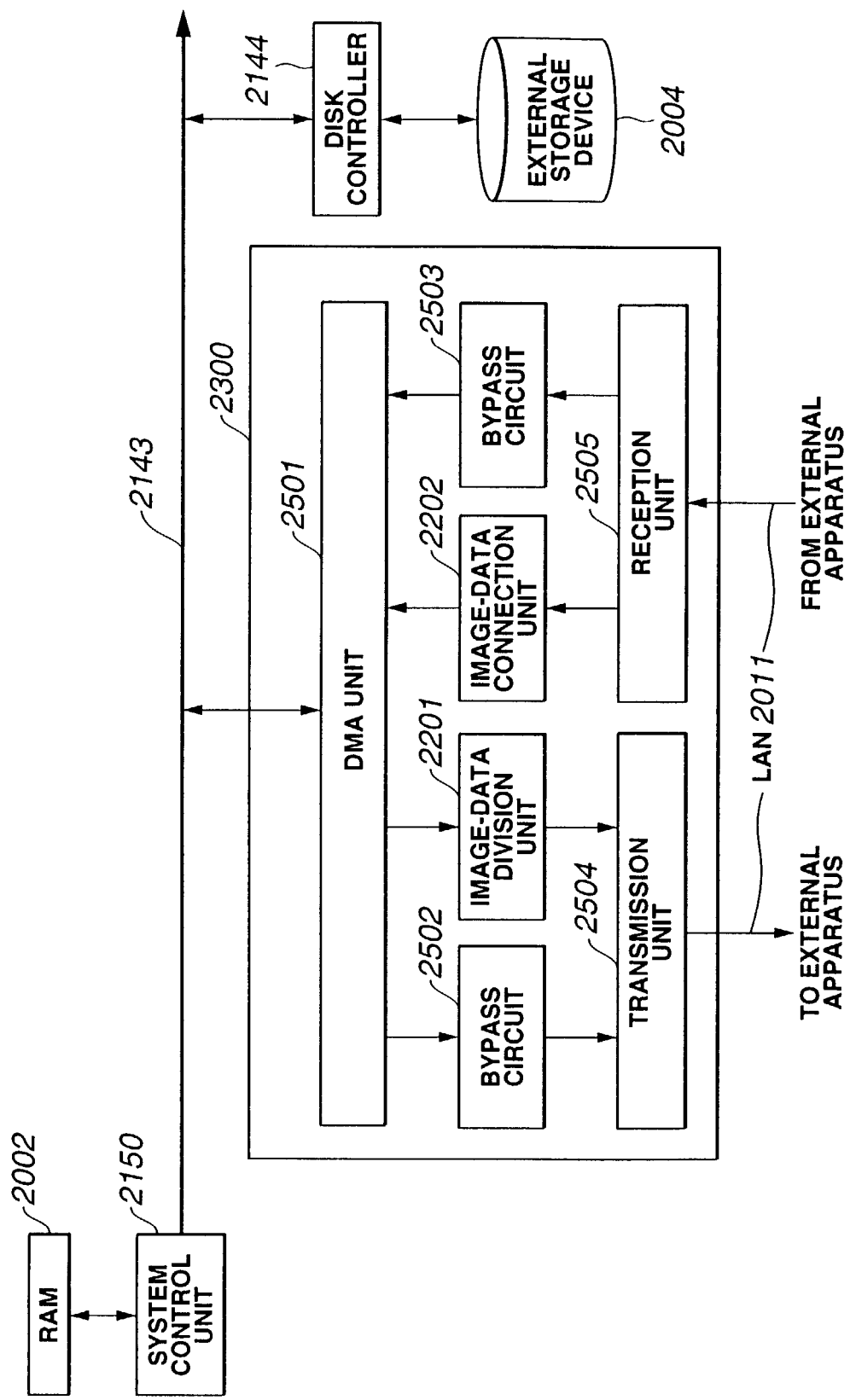
FIGS. 25 and 26 are diagrams, each illustrating the internal configuration of the network unit shown in FIG. 24.

FIG. 25 illustrates the internal configuration of the network unit 2300. The network unit 2300 is a function expanding board having a network connection function and an image-data-form conversion function. The network unit 2300 incorporates a DMA unit 2501, bypath circuits 2502 and 2503 for transferring data without performing image conversion, an image-data division unit 2201 having the same function as in the above-described embodiments, an image-data connection unit 2202, a transmission unit 2504 for outputting data onto a network, and a reception unit 2505 for receiving data transmitted from the network. The transmission unit 2504 and the reception unit 2505 realize the same function as the network connection function by the LAN controller 2010, the MAC 2145 and the PHY/PMD 2146.

Next, a description will be provided of a case in which the network unit 2300 transmits/receives tile-image data with an external apparatus (a PC, another digital composite apparatus or the like) within the same network connected by a LAN 2011. First, the reception unit 2505 analyzes image data transmitted from the external apparatus with a predetermined communication protocol and format, and extracts data packets conforming to the format shown in FIG. 3.

When it is necessary to convert tile-image data of the data packets into page-image data, the image-data connection unit 2202 performs data form conversion similar to the one described above. The DMA unit 2501 transfers the page-image data to a RAM 2002, an external storage device 2004 or the like. When tile-image data is required, the data packets are transferred to the external storage device 2004 or the like by the DMA unit 2501 via the bypath circuit 2503.

When transmitting the page-image data stored in the external storage device 2004 to an external apparatus on the network, the DMA unit 2501 reads the page-image data from the external storage device 2004, and the image-data division unit 2201 converts the read page-image data into data packets similar to the ones described above. The transmission unit 2504 transmits the data packets after conversion to the external apparatus on the network. When the external apparatus requires page data, the bypath circuit 2502 is used.

The case of dealing with an image by performing transmission/reception of data packets with an external apparatus, and converting the data packets into page-image data within a composite-apparatus controller has been described. However, the conversion function of the network unit 2300 may be configured so that an image is dealt with by performing transmission/reception of image data in units of a page with an external apparatus, converting the image data into data packets within a composite-apparatus controller.

Figure 26:
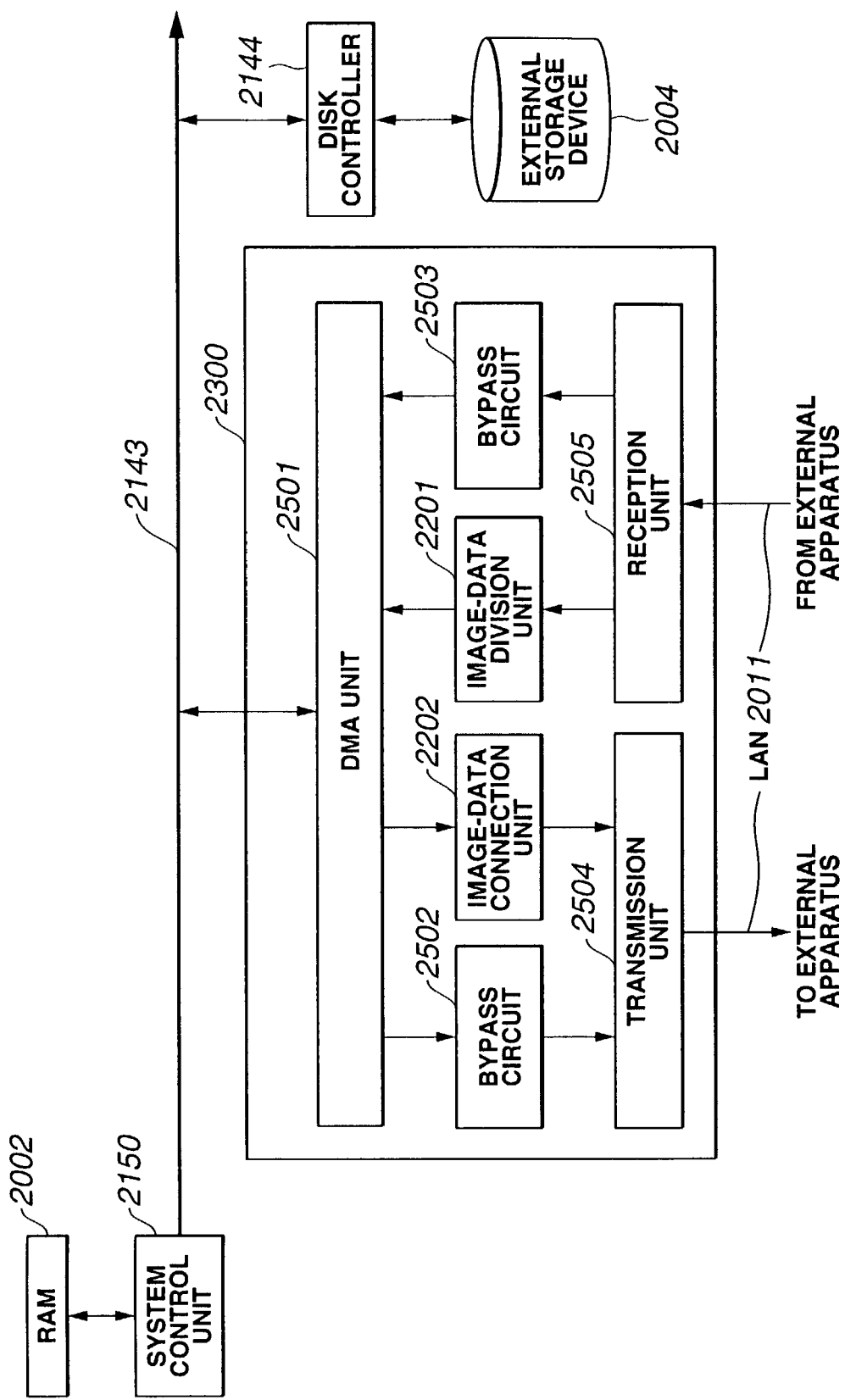

In this case, as shown in FIG. 26, only by exchanging the positions of the image-data division unit 2201 and the image-data-form conversion unit 2202, the function of the network unit 2300 can be easily changed. As described above, an image-data-form conversion function is also provided in the network unit. Thus, as in the above-described embodiments, the load of software processing in the controller can be reduced.

(Sixth Embodiment)

In a sixth embodiment of the present invention, an example of composite processing executed in the digital composite apparatus having the configuration shown in FIG. 2 will be described. In the sixth embodiment, parallel processing of the following image transmission processing and facsimile reception processing will be described.

Figure 27:
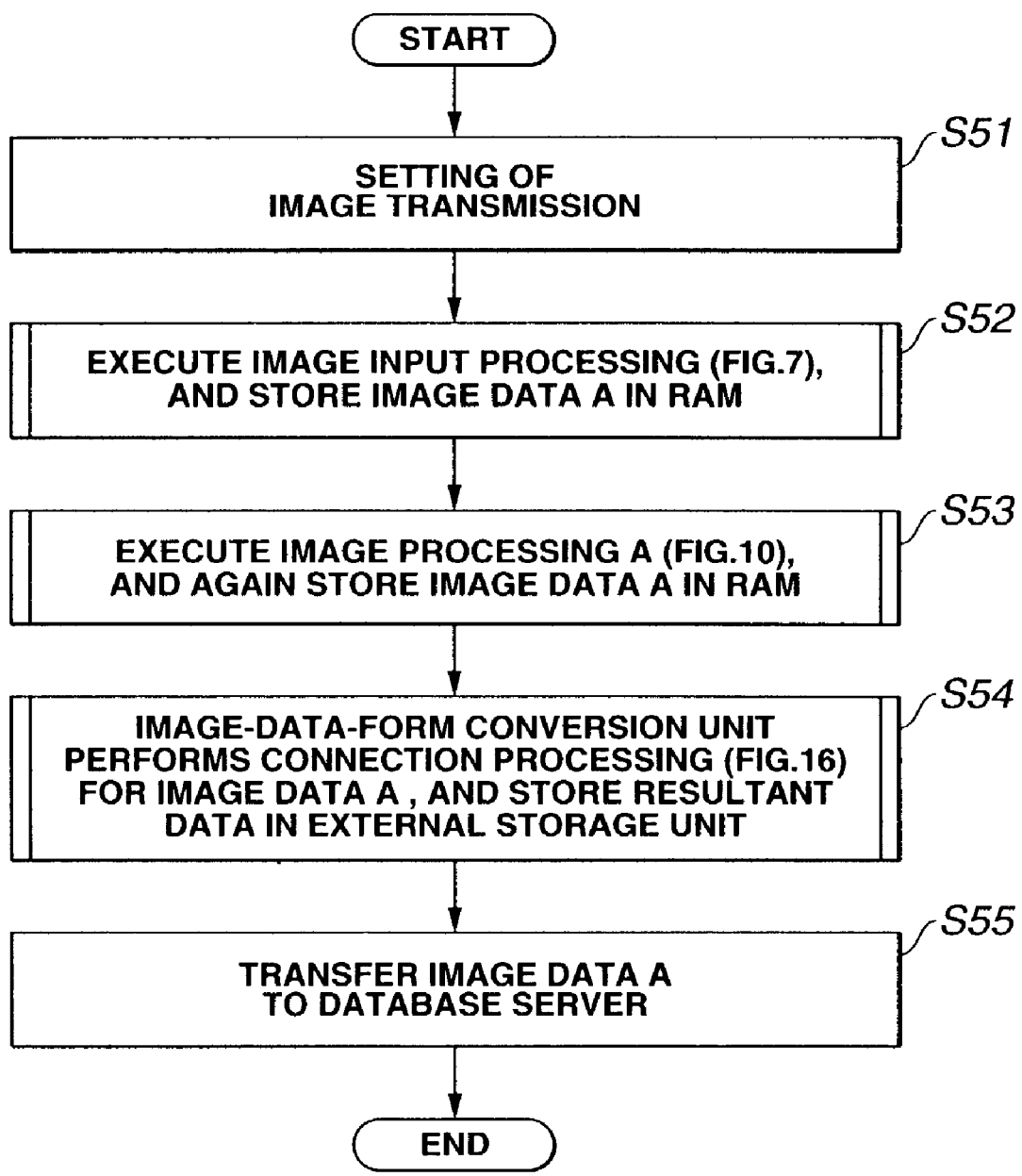
FIG. 27 is a flowchart illustrating an image transmission processing procedure in the digital composite apparatus shown in FIG. 2, according to a sixth embodiment of the present invention.

Image transmission processing (see FIG. 27): After performing binary-encoding processing and rotation processing for image data "A" obtained by reading an image of an original by the scanner 2070, the image data A is transmitted to the database server 1002 shown in FIG. 1 via the LAN 2011.

Facsimile reception processing (see FIG. 28): After performing resolution conversion processing and rotation processing for image data "B" received from the FAX 1031 shown in FIG. 1 via the communication network 2051, the image data B is output from the printer 2095.

In the sixth embodiment, a case of using the image-data-form conversion unit 2200 in image transmission processing, but not using the image-data-form conversion unit 2200 in facsimile reception processing will be illustrated. First, the procedure of image transmission processing will be described with reference to the flowchart shown in FIG. 27. In this processing procedure, the CPU 2001 controls each processing unit by directly transmitting a control signal, or a command packet and an interrupt packet shown in FIGS. 4 and 5, respectively, to the processing unit.

Figure 10:
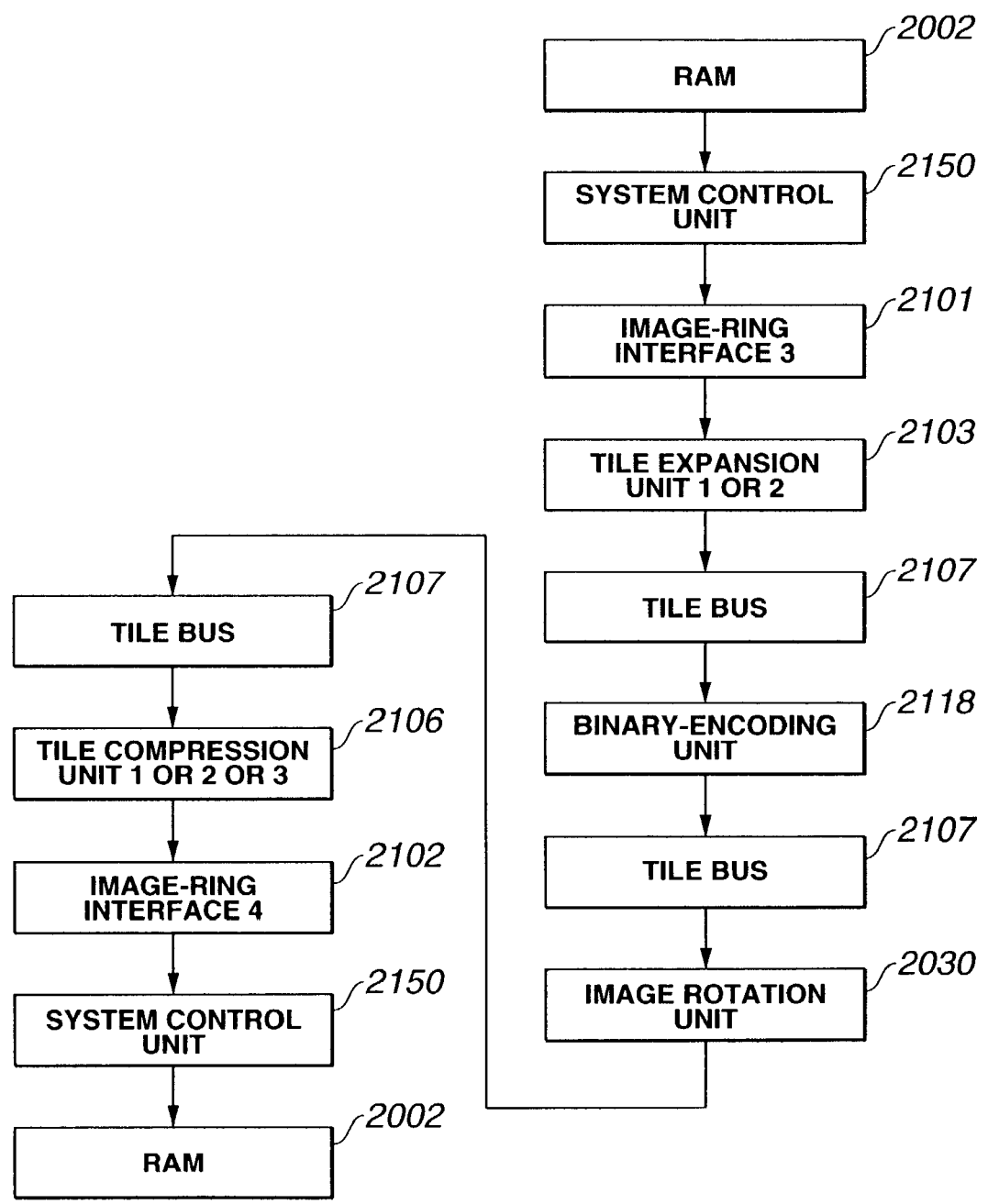
FIG. 10 is a diagram illustrating the path of data between blocks relating to image processing A.

The CPU 2001 transmits setting information for image transmission based on the operator's instruction information or the like from the UI 2012 to the image processing unit 1 2149, the image-data-form conversion unit 2200, the LAN controller 2010 and the like. Each processing unit that has received the setting information performs various types of setting for executing processing for transmitting image data (step S51). Then, for the image of the original set on the scanner 2070, the image input processing shown in FIG. 7 is executed, and the image data "A" is stored in the RAM 2002 (step S52). Then, for the image data "A" stored in the RAM 2002, the image processing A shown in FIG. 10 is executed, and the image data A is again stored in the RAM 2002 (step S53). Then, the image-data-form conversion unit 2200 reads the image data "A" stored as data packets from the RAM 2002. The header deletion processing and the tile connection processing shown in FIG. 16 are performed for the read data packets, and page-image data "A" obtained by the processing is stored in the external storage device 2004 (step S54). Then, the page-image data "A" stored in the image storage device 2004 is converted into a predetermined format (for example, TIFF). The converted page-image data "A" is transmitted to the database server 1002 via the LAN 2011 (step S55).

Figure 28:
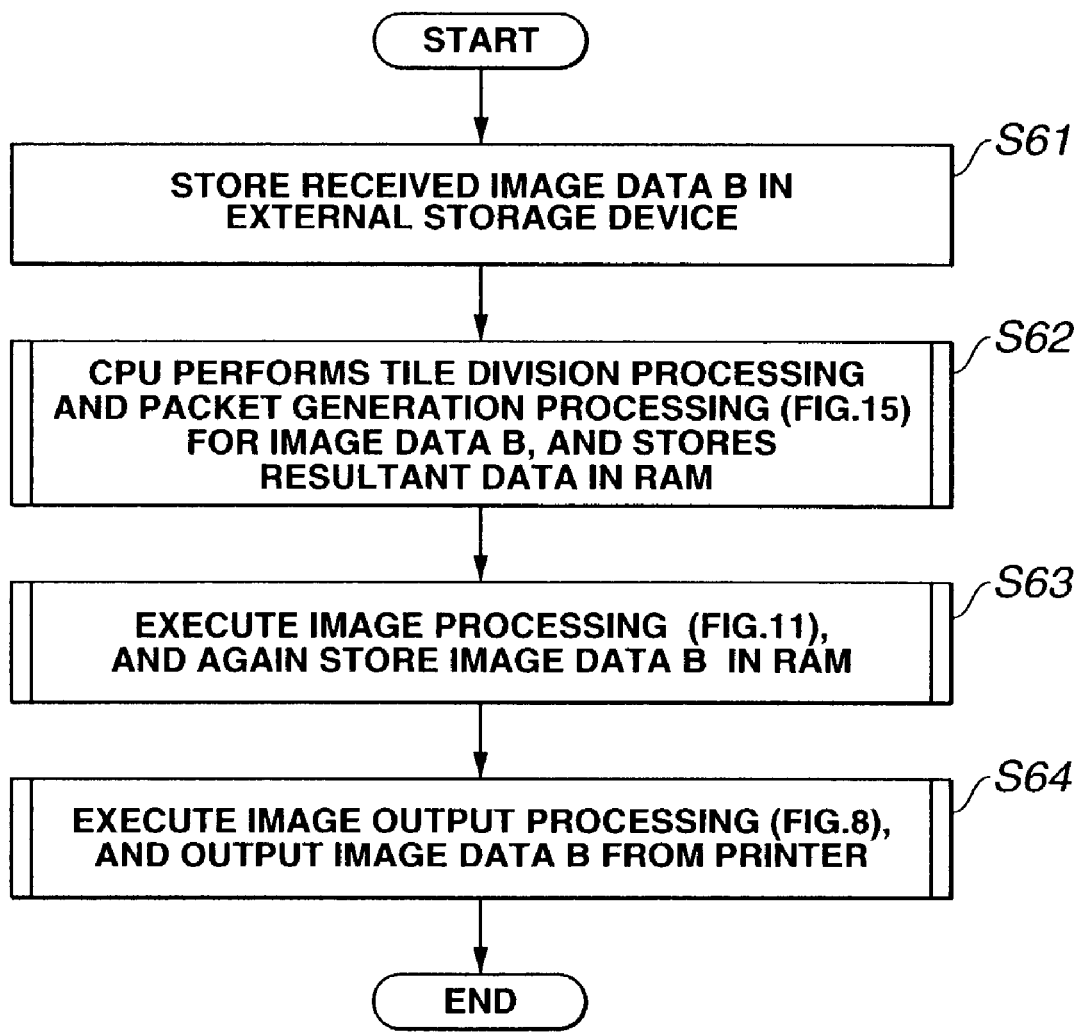
FIG. 28 is a flowchart illustrating a facsimile reception processing procedure in the digital composite apparatus shown in FIG. 2.

Next, the procedure of facsimile reception processing will be described with reference to the flowchart shown in FIG. 28. In this processing procedure, the CPU 2001 controls each processing unit by directly transmitting a control signal, or transmitting a command packet and an interrupt packet shown in FIGS. 4 and 5, respectively.

Figure 11:
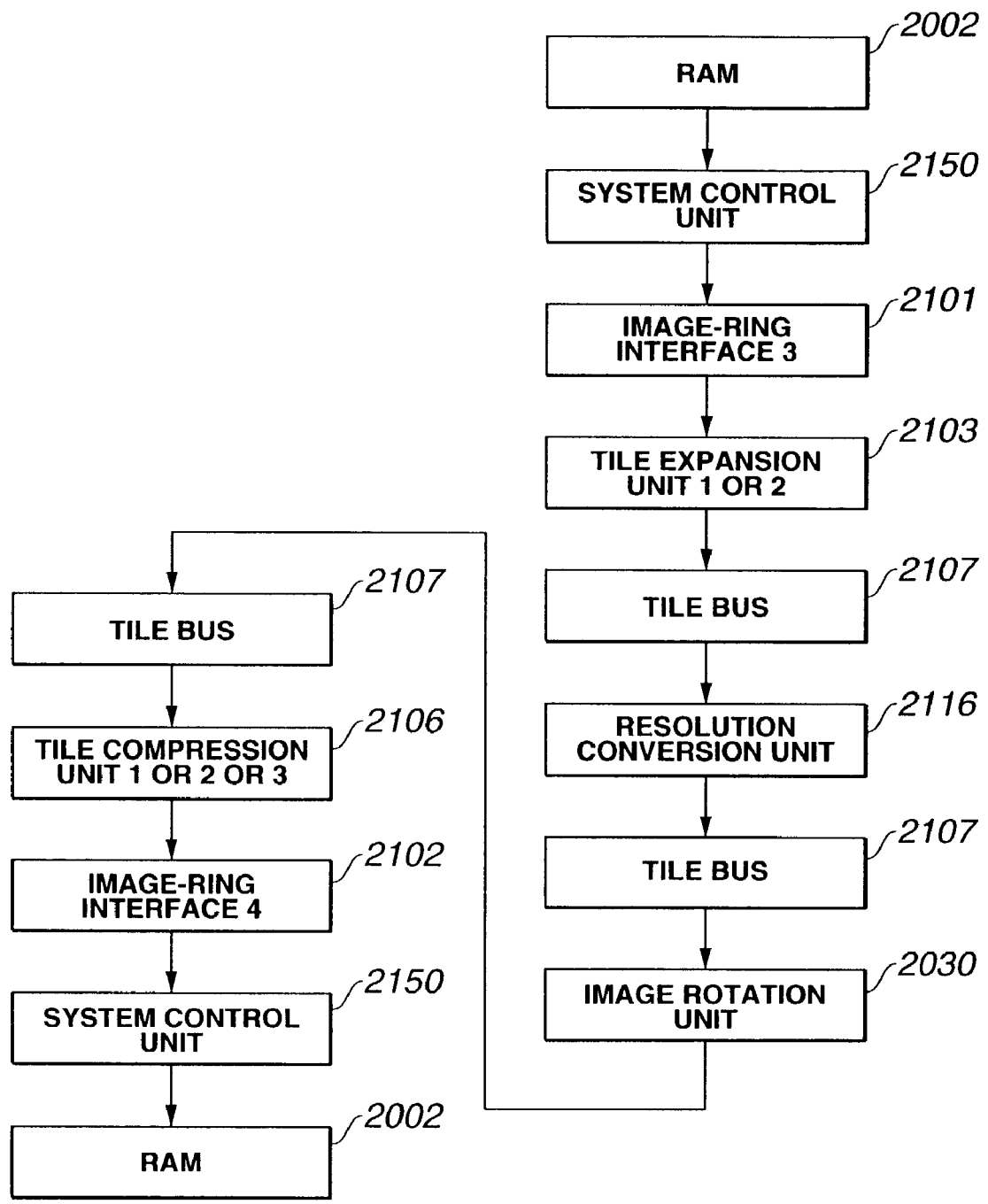
FIG. 11 is a block diagram illustrating the path of data between blocks relating to image processing B.

First, the modem 2050 receives image data "B" in units of a page received from the FAX 1031 via the public line 2051. The received image data B is stored in the external storage device 2004 (step S61). Then, the CPU 2001 reads the image data "B" stored as page-image data from the external storage device 2004. For the read page-image data "B", the tile division processing and the packet generation processing shown in FIG. 15 are performed, and data packet B obtained by the processing is stored in the RAM 2002 (step S62). Then, for the image data B stored in the RAM 2002, the image processing B shown in FIG. 11 is performed, and the image data B is again stored in the RAM 2002 (step S63). Then, for the image data B stored in the RAM 2002, the image output processing shown in FIG. 8 is executed, and the image data B is output form the printer 2095 (step S64).

The image transmission processing and the facsimile reception processing have been described. The digital composite apparatus simultaneously executes the two types of processing in parallel. In this case, it is also possible to execute high-speed parallel processing that does not provide a large load on the CPU 2001. This is because, while the image-data-form conversion unit 2200 executes header deletion processing and tile connection processing in image transmission processing, the CPU 2001 executes tile division processing and packet generation processing in facsimile reception processing. That is, since the image-data-form conversion unit 2200 operates as a hardware accelerator for assisting packet processing to be performed by the CPU 2001, the load of the CPU 2001 can be dispersed.

It is also possible to adopt a configuration in which, while the image-data-form conversion unit 2200 executes facsimile reception processing and tile division processing, the CPU 2001 executes header deletion processing and tile connection processing in image transmission processing. In this case, it is also possible to disperse the load of the CPU 2001. The same effects are obtained in a configuration in which the network unit shown in FIG. 24 is used.

Although in the sixth embodiment, processing relating to two sets of image data has been described, the present invention is not limited to such a case, but may be applied to processing relating to single image data. For example, in the above-described image transmission processing, a configuration may be adopted in which the CPU 2001 and the image-data-form conversion unit 2200 perform the header deletion processing and the tile connection processing relating to image data "A" performed in step S13 in parallel by sharing processing in units of a page. In this case, high-speed image transmission processing is achieved.

Not only in the above-described image transmission processing and facsimile reception processing, but also when executing another type of image processing, such as printing processing in which printing data transmitted from an external apparatus, such as a PC or the like, is printed, or an output processing in a remote apparatus in remote copying operation, a duplex copying operation or the like, the same effects as in the sixth embodiment are, of course, obtained.

As described above, in the sixth embodiment, a tile-image extraction function and a tile-image connection function in image transmission processing are executed by hardware processing by the image-data-form conversion unit, and a tile-mage division function, a packet generation function and a management-table generation function in facsimile reception processing are executed by software processing by the CPU. It is thereby possible to reduce the load of the CPU and increase the speed of processing when executing parallel processing.

(Seventh Embodiment)

Figure 29:
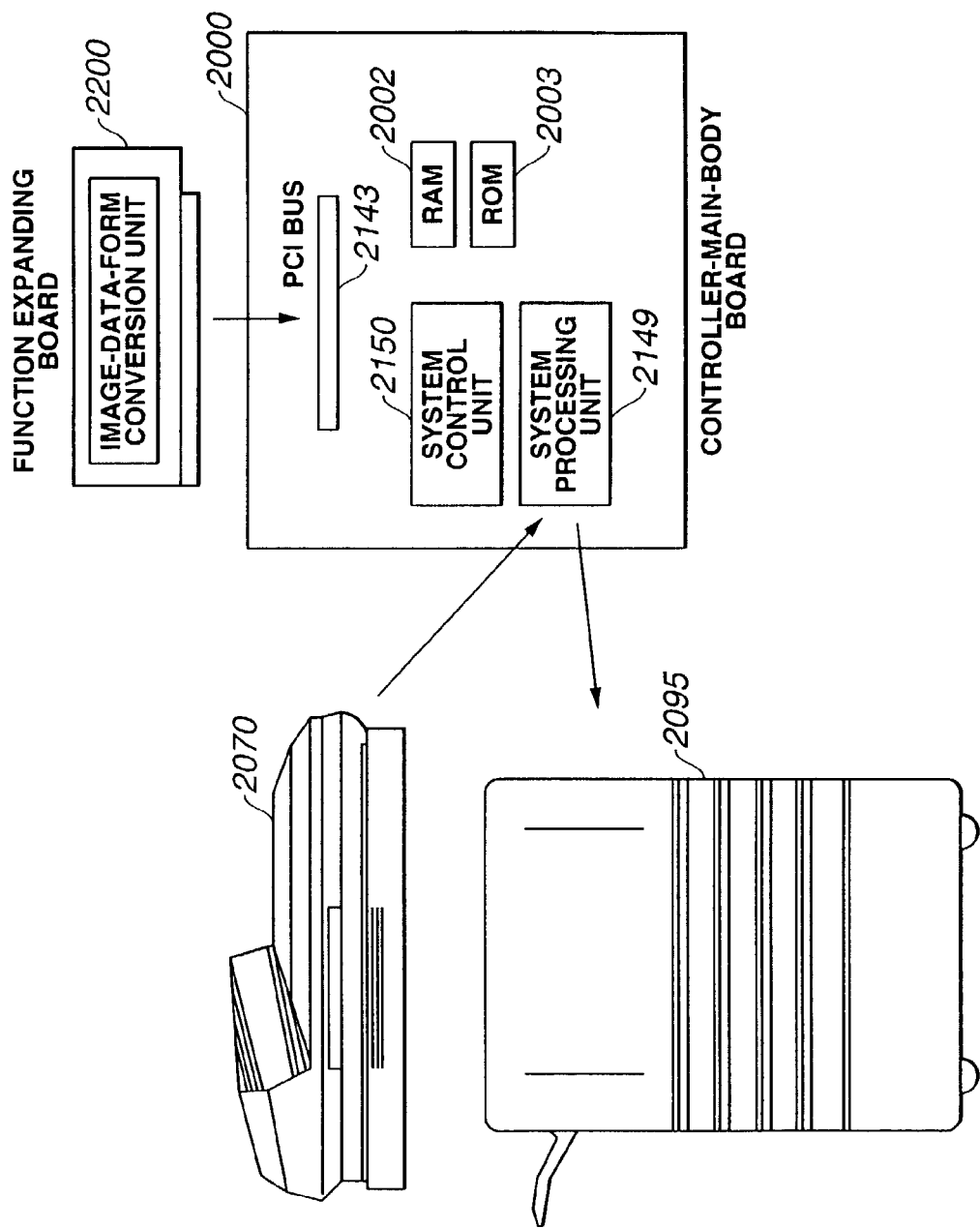
FIG. 29 is a diagram illustrating a hardware configuration of the digital composite apparatus, according to a seventh embodiment of the present invention.

In a seventh embodiment of the present invention, a description will be provided of a hardware configuration of the digital composite apparatus 1001 shown in FIGS. 2A–2C. As shown in FIG. 29, the digital composite apparatus shown in FIGS. 2A–2C includes the scanner 2070 in the form of a unit, the printer 2095 in the form of a unit, and the image-processing-apparatus controller 2000 in the form of a board. The controller-main-body board of the image-processing-apparatus controller 2000 is incorporated within one of the two units. The system control unit 2150 and the image processing unit 1 2149 are provided as ASICs on the controller-main-body board. Similarly, the PCI bus 2143 is provided on the controller-main-body board.

The image-data-form conversion unit 2200 that has been described as a principal unit of the present invention is provided as an ASIC on a function expanding board. The function expanding board is detachably mountable with respect to the controller-main-body board. When intending to utilize the function of the image-data-form conversion unit 2200, the function expanding board is connected to the PCI bus 2143 of the controller-main-body board.

By thus connecting the image-data-form conversion unit on the function expanding board to a general-purpose bus, it is possible to realize the function of assisting packet processing performed in the digital composite apparatus as described in the foregoing embodiments. Since it is only necessary to perform a simple operation of connecting the unit as an optional board, it is possible to flexibly change the configuration of the digital composite apparatus in accordance with a request of the operator.

(Other Embodiments)

Although in the foregoing embodiments, only one image processing unit 1 2149 is used in the digital composite apparatus, the present invention is not limited to such a configuration, but may include a plurality of image processing units. In this case, a CPU must manage packet processing relating to the plurality of image processing units. Accordingly, the effect of dispersion of the load by the image-data-form conversion unit of the present invention is further improved. The processing functions performed by the image-data-form conversion unit are not limited to the ones described in the foregoing embodiments. For example, the image-data-form conversion unit may also be allowed to execute a function of describing the contents of processing in Process Instruction. Although in the foregoing embodiments, a PCI bus has been illustrated as a general-purpose bus, the present invention is not limited to such a case, but may use any other appropriate bus, such as an ISA (Industry Standard Architecture) bus or the like.

The image-data-form conversion unit and the network unit of the present invention are not necessarily directly connected to a general-purpose bus. For example, the image-data-form conversion unit may be configured as one unit separate from the digital composite apparatus, and may be operated in a state of external connection via a predetermined interface (such as an SCSI (small computer system interface) or the like).

Although in the foregoing embodiments, the case of applying the present invention to the digital composite apparatus shown in FIG. 1 has been illustrated, the present invention is not limited to such a case. The present invention may also be applied to a single printing apparatus, scanner apparatus, facsimile apparatus, personal computer or the like, provided that tile-image data can be processed.

The individual components shown in outline or designated by blocks in the drawings are all well known in the image processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for performing image processing on image data, comprising:

a plurality of creation units including at least first and second creation units, each constructed to divide page data into a plurality of tile image data and to create a corresponding plurality of packet data to which first and second processing information and first and second designating information are added, wherein the first processing information indicates content of first image processing, the first designating information designates an image processing unit for performing the first image processing, the second processing information indicates content of second image processing, and the second designating information designates an image processing unit for performing the second image processing;

a first image processing unit constructed to perform the first image processing on the tile image data included in the packet data based on the first processing information;

a second image processing unit constructed to perform the second image processing on the tile image data included in the packet data based on the second processing information;

a transferring unit constructed to transfer the packet data to the first image processing unit based on the first designating information and thereafter to transfer the packet data which includes the tile image data on which the first image processing is performed to the second image processing unit based on the second designating information in a case where an order information, which indicates the second image processing should be performed after the first image processing, is added to the packet data; and a connecting unit constructed to connect said first creation unit and said transferring unit with a first bus, and to connect said second creation unit and said transferring unit with a second bus.

2. An image processing apparatus according to claim 1, wherein attribute information is added to each data packet, wherein the attribute information indicates the position of the tile image data to the page data, and wherein said image processing apparatus further comprises:

a combining unit constructed to combine the plurality of tile image data on which the first image processing and the second image processing are performed based on the attribute information, thereby to create page image data.

3. An image processing apparatus according to claim 2, wherein said plurality of creation units create the tile image data by compressing the image data divided from the page data, and wherein said combining unit creates the page image data by expanding the tile image data created by said plurality of creation units.

4. An image processing apparatus according to claim 1, wherein one of said plurality of creation unit creates packet data based on the page data which is convened from print data received from an eternal apparatus.

* * * * *

UNITED STATES PATENT AND TRADEMARK OFFICE
CERTIFICATE OF CORRECTION

PATENT NO. : 7,193,738 B2
APPLICATION NO. : 10/192157
DATED : March 20, 2007
INVENTOR(S) : Nobuyuki Yuasa Page 1 of 1

It is certified that error appears in the above-identified patent and that said Letters Patent is hereby corrected as shown below:

COLUMN 5:
　　Line 13, "form" should read -- from --.

COLUMN 26:
　　Line 6, "unit" should read -- units --;

Line 7, "convened" should read --converted--; and

Line 8, "eternal" should read -- external --.

Signed and Sealed this

Twenty-seventh Day of November, 2007

JON W. DUDAS
*Director of the United States Patent and Trademark Office*